FIG. 3
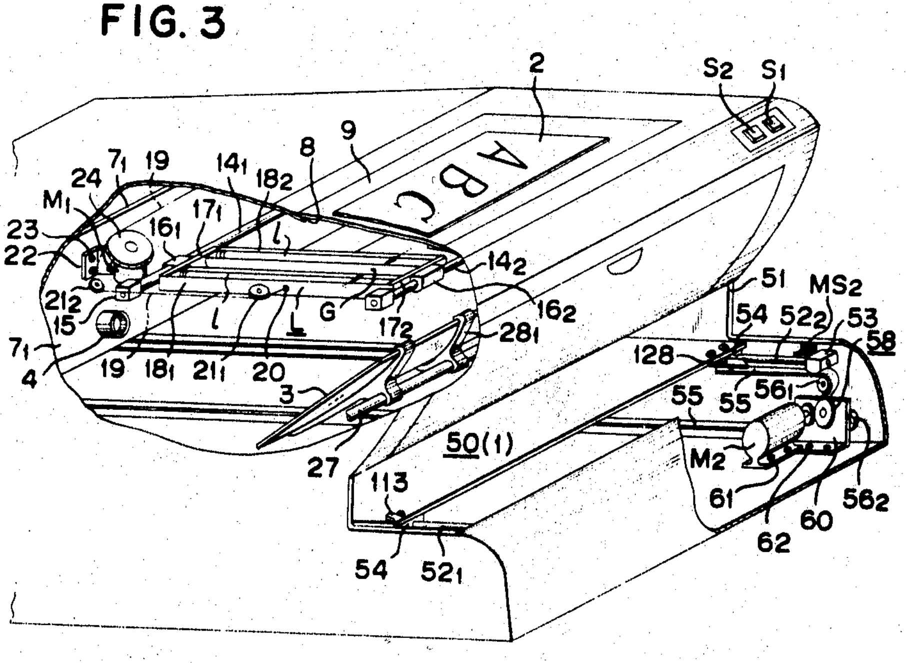
FIG. 4
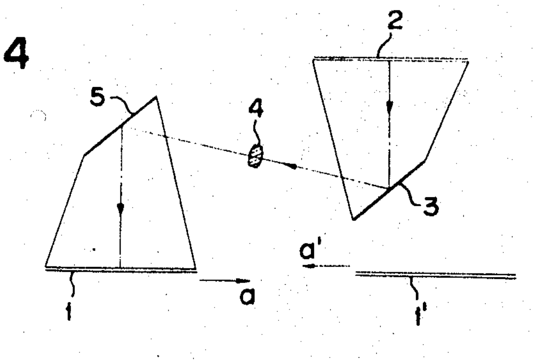
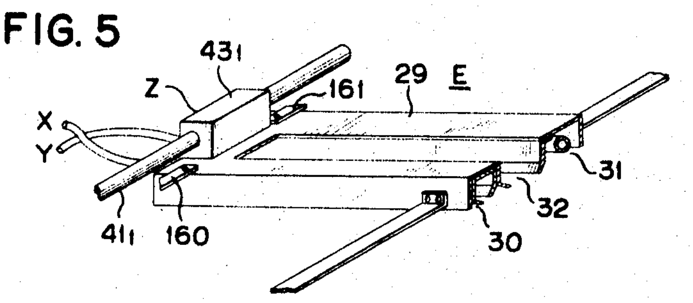

April 15, 1969 HIROSHI TANAKA ET AL 3,438,706

ELECTROPHOTOGRAPHIC DEVICE

Filed Oct. 7, 1966 Sheet 14 of 18

United States Patent Office
3,438,706
Patented Apr. 15, 1969

3,438,706
ELECTROPHOTOGRAPHIC DEVICE

Hiroshi Tanaka, Shinkichi Takahashi, and Tetsuo Hasegawa, Tokyo, and Toshihiko Sato, Saitama-ken, Japan, assignors to Canon Camera Kabushiki Kaisha, Tokyo, Japan, a corporation of Japan

Filed Oct. 7, 1966, Ser. No. 585,091
Claims priority, application Japan, Oct. 11, 1965, 40/62,246; Oct. 27, 1965, 40/65,491; Mar. 23, 1966, 41/17,781, 41/17,782; June 14, 1966, 41/38,695; Aug. 23, 1966 (utility model), 41/79,861; Aug. 25, 1966, 41/56,010; Aug. 30, 1966, 41/57,482; Sept. 14, 1966, 41/60,332
Int. Cl. G03g *5/04, 13/22, 15/00*
U.S. Cl. 355—11 23 Claims

The present invention relates generally to electrophotographic copying means and, more particularly, to an electrophotographic copier wherein a static image is formed on the surface of the insulating layer of a photosensitive plate, the image is visualized by a developer, the visible image is thereafter transferred onto copying material, which is then fixed to obtain a permanent electrophotographic copy image. Additionally, the copier comprises means for cleaning the photosensitive plate after the completion of the transfer of the visible image, so that the photosensitive plate can be used over and over again. Further, the invention comprises a microfilm reader-copier.

In accordance with the conventional Xerox (trademark) copying system, a static image is formed by means of the so called Carlson process, as described in U.S. Patent No. 2,297,691. According to said process, the photoconductive layer of a photosensitive plate is formed of amorphous selenium. The photoconductive layer is uniformly charged by direct current corona discharge, and then the original image is projected thereon to discharge the electric charge on the portion exposed to the light rays. A static image is thus formed on the surface of the photoconductive layer in accordance with light and dark pattern of the original image. The static image is visualized or developed by means of the Cascade method, using electric static powder (which is hereinafter referred to as "toner"). Thereafter, the visible image is transferred onto copying material, and it is then fixed to produce the permanent electrophotographic copy image. The photosensitive plate is then cleaned by a fur brush, and the cleaned photosensitive plate can be used over and over again.

In copying devices based on the Carlson process, it is necessary to bind an electric charge directly on the surface of the photoconductive layer and, therefore, the material used for forming said photoconductive layer must have a high resistivity. The choice of available materials is thus restricted to specific photoconductive materials which can bind a charge, and which have high resistivity, such as amorphous selenium. The sensitivity of such a conventional photosensitive plate is low, at most around ASA 10, and the static contrast of the static image is around 300 to 500 v. at most. Another problem is that, when the photosensitive plate is used over and over again, it is easy to cause damage and deterioration on the surface thereof, and because of fatigue of the photoconductor, the quality of the image deteriorates. The plate must then be replaced.

There has bene proposed an alternative method in U.S. Patent No. 3,124,456 issued to T. H. Moore. According to this patent, the photosensitive plate has a photoconductive layer composed of CdS or CdSe and a binder resin provided on a conductive base, and a transparent insulating layer is applied thereover. Radiation of the original image and the charging of the plate are carried out simultaneously from the side of the transparent insulating layer, and the static image is formed on the surface of the transparent insulating layer by making use of a difference in building up of this charge. This difference is caused by the difference of the time constant brought about by the difference of the impedance of the photoconductive layer in the light and dark places of the original image. Since the static image is formed by means of the difference of impedances of the photoconductors, the static contrast is still low. In order to obtain an execellent image by means of this device, the capacitance of the transparent insulating layer must be larger than the capacitance of the photoconductive layer, and the thickness of the transparent insulating layer must be controlled within the range of from 2 to 6μ. With such a thin insulating layer, breakdowns can readily occur, and it is difficult to use such a photosensitive plate for a long period of time. When the thickness of the translucent insulating layer is increased, the static contrast deteriorates, and the quality of the image is lowered.

Another alternative system has been proposed in U.S. Patent No. 3,041,167 issued to R. M. Blakney et al., according to which the photosensitive plate comprises a photoconductive layer on a conductive base, and an overcoating layer protecting the photoconductive layer. In this method, before carrying out the sensitizing charge, a charge of the polarity opposite to that of the sensitizing charge is bound onto the surface of the coating layer, or, after having carried out the charging treatment, light rays are uniformly irradiated on the whole surface. But this charging does nothing at all for the formation of the static image. Rather, after the completion of the copying cycle, a charge is trapped on the surface between the photoconductive layer and the over-coating layer which must be removed. This is done by charging the surface of said over-coating layer with a charge of the opposite polarity. Fatigue of the photosensitive plate is cured by having the trap charge of the opposite polarity against the photoconductive layer, which is not charged. The sensitizing charge is then carried out, there being no trap charge in the photoconductive layer.

In accordance with this process, the fatigue of photosensitive plate is completely cured, but in so far as the static image forming process is concerned, there is little difference between the static contrast of the Carlson process and that of this process. By carrying out the illumination of the original image after the sensitizing charge, the photoconductors become conductive in the light exposed areas, and the carrier is injected from the side of the conductive base to weaken the external field by means of the charge on the over-coating layer, and the static contrast is formed between the same and the unexposed areas. In other words, static contrast is obtained by the difference of the capacitances between the two layers, i.e., the over-coating layer and the photoconductive layer in the light exposed area and the unexposed area, and therefore, the obtained static contrast is around 300 to 500 v. at most. When compared with the photosensitive plate without an over-coating layer, there is not a large difference. On the other hand, the over-coating layer must be very thin, compared to the photoconductive layer, and therefore, it will, in time, wear out or break down, and it is not possible to protect the photoconductive layer really well. It is thus difficult to expect long term use of the photosensitive plate.

The electrophotographic copying device of the present invention is based on a completely new process which overcomes the drawbacks of the above-noted processes. The electrophotographic copying device of this invention is based on the process described in copending U.S. patent application Ser. No. 563,899 and Ser. No. 571,538 of the present applicants.

In the process of this invention, fundamentally speaking, the photosensitive plate comprises a base, a photoconductive layer on said base, and a translucent insulating layer on said photoconductive layer. First of all, the surface of the translucent insulating layer is charged (the primary charge), and by making use of the field thereof, the charge layer is strongly trapped between the photoconductive layer and translucent insulating layer and in the immediate neighborhood thereof. Next, an alternating current corona discharge (the secondary corona discharge) of the polarity opposite to the primary charge, and the illumination of the original image, are carried out simultaneously. Then, light rays are uniformly irradiated on the whole surface of the translucent insulating layer to form the static image of high contrast in accordance with light and dark patterns of the original image on the surface of the translucent insualting layer.

The static contrast obtained in accordance with the present process is remarkably high. The photoconductive layer has a thickness almost the same or a little thicker than the photoconductive layer described in U.S. Patent No. 3,041,167, and the insulating layer has a thickness the same as that described in U.S. Patent No. 3,041,167. With these thicknesses, it is possible to obtain the static contrast ranging from 1000 v. to 1500 v.

Thus, in accordance with the present invention it is possible to employ the translucent insulating layer whose thickness is from $10\mu$ to $50\mu$, and therefore, it is possible to form the layer by means of the adhesion of insulating film without being restricted to the resin coating method, and it is thus possible to properly protect the photoconductive layer. At the same time the photosensitive plate has a greatly extended useful life.

The novel process for forming a static image of high contrast on the insulating layer requires new devices different from the conventional copiers, not only for the means for forming the static image, but also for development, transfer of the image, cleaning, etc.

Firstly, it is necessary to charge the surface of the translucent insulating layer of the photosensitive plate, as mentioned above. In this case, the charge layer of the polarity opposite to that of the charge on the surface of the insulating layer should be formed in the neighborhood of the adjoining surface of the photoconductive layer and the translucent insulating layer. Therefore, the conventionally known corotron, or scorotron, or a like corona discharger, or any suitable device for charging by closely adhering an electrode onto the translucent insulating layer, can be employed. Next, as the means for irradiating corona discharge of the polarity opposite to the primary charge or alternating current corona discharge, a corona discharger whose upper portion is optically open is required, because the original image should be irradiated through said corona discharger simultaneously. Also, this corona discharger should be constructed so that the charge width and the slit exposure width are equal.

Next, as the means for uniformly irradiating light rays throughout the whole surface of the translucent insulating layer, a source of actinic radiation such as an infrared ray lamp, a fluorescent lamp, or the like should be used. As the means for developing the static image, the fur brush developing method, magnetic brush developing method, or Cascade developing method or the like can all be used, but the fur brush developing method is particularly adapted for the device of the present invention.

With the Carlson process, the contrast of the static image has been 300 v. to 600 v. at most, and therefore, it has been impossibe to cover sufficiently the change of friction-generated tribo-charge caused by the environment even by employing such means as the bias method. Also, in order to produce a positive-positive image, it is necessary that the toner have a charge of the polarity opposite to that the charged portion (in the case of Xerox® it is + and in the case of Eletcrofax® it is —) so that it will adhere on the charged portion and not adhere on the non-charged portion. If the fur brush developing method is used, the toner is sprayed on at the time when the photosensitive plate and the brush are rubbed together, and it physically adheres onto the non-charged portion, bringing about the so-called fog, and therefore it cannot be used on the practical basis. Where a negative-positive image is desired, the toner should adhere to the non-charged portion, and therefore, good results can be obtained, but since the voltage of the contrast is low, it is difficult to produce a really good image. On the other hand, a fur brush is generally required to sufficiently clean off the surface of the photosensitive plate, and since the surface of the photosensitive plate is generally rough, (particularly in the case of Electrofax®) fog is created mechanically when the plate is strongly brushed with a fur brush. The fur brush thus cannot be practically used for negative-positive either. Therefore, the Cascade method or the magnetic brush developing method have been heretofore employed. As is well known, these methods require elaborate apparatus.

However, in accordance with the process which is employed in the device of the present invention, the contrast of the static image is 1000 v. to 1500 v. At the same time, the surface on which the static image is formed is a smooth and highly insulated layer. Therefore, in case the secondary corona discharge is the direct current corona, and a positive-positive image is to be obtained, the toner of the opposite polarity adheres to the non-charged portion, or the portion where the degree of charge is low. A foggy image is thus avoided, even when spraying the toner at the same time, since the surface is smooth. Nor is there any fear that a mechanically fogged image will be created even with hard rubbing, and an excellent visible image can be formed.

The static image which is formed when the applied secondary corona discharge is an alternating current corona is mainly bonded on the dark places of the original image and is formed by the positive charge (in case when the primary charge is positive), but in the light places of the original image, a negative charge is formed, to thus form a positive and negative static image, and for the same reasons as in the case when the secondary corona discharge is direct current, foggy images are avoided. In either case, the static image has a high contrast, and the bias developing method is very effectively employed.

Since the field of the static image is strong, when the relative resistance of the fur brush, which is the carrier, is low, the attenuation of charge is remarkable. This can bring about undesired phenomena such as Lichtenberg image caused by discharge development or the like and, therefore, the resistance of the carrier should be high. It has been determined that, to produce excellent images, the resistance of the carrier must be greater than $10^8\Omega$-cm. When the so-called magnetic brush developing method is adopted for the device of the present invention, it is necessary to use a novel magnetic brush developing device. Even in this case the carrier must be insulating, and it should be covered by a resin having a resistance greater than $10^8\Omega$-cm.

On the other hand, in the embodiment where AC corona discharge is applied simultaneously with the irradiation of the original image, the static image can be formed by the positive charge and the negative charge, and therefore at the time when development is carried out it is possible to produce a remarkably fogless visible image.

The transfer of the visible image can be carried out by applying a corona discharge from behind the copying material, which is overlaid on the photosensitive surface, as is conventionally done. But, insofar as the present invention is concerned, the static image forming surface of the photosensitive plate is the highly insulating layer, and therefore when the corona discharge is applied from the side of the copying material, after laying the copying material thereon, the charge caused by the corona discharge is trapped on the photosensitive plate, and it is easy to create a large electric field between the copying material and the photosensitive plate. Therefore, transfer of the image is poor.

On the other hand, the press-transfer method, which cannot be done in accordance with the Carlson process, can be effectively adapted as the image transferring means in the present invention. Thus, in the embodiment wherein the direct current secondary corona discharge is applied simultaneously with the irradiation of the original image, and when the formed static image is developed as a positive-positive image, it is possible to obtain excellent transfer of the image by laying the copying material on the visible image surface of the photosensitive plate, and pressing the copying material against the photosensitive plate with a conductive elastic roller.

The charged toner between the copying material and the photosensitive plate is considered to be divided by the difference of capacities between the two. Of course in this case, most of the charge on the photosensitive plate which controls the toner forms the electric field between the same and the charge induced on the side of the copying material to free the toner. Generally speaking, papers are used as the copying materials, and since the capacitance thereof is larger than the capacitance of the insulating layer and the photoconductive layer of the photosensitive plate, more of the charged toner is moved to the copying material, and excellent transfer of the visible image is obtained.

In this case, it is especially important that the elastic conductive roller and the base of the photosensitive plate have the same potential, and they are preferably
have the same potential, and they are preferably
grounded.

However, in the embodiment employing an alternating current secondary corona discharge, the static image is mainly formed by the primary charge remaining in the dark portion of the original image and, therefore, in order to obtain the positive-positive image, the visible image is produced by the toner charged in the polarity opposite to the polarity of the charge of the static image. It is thus impossible to effect transfer by simple pressing. In this case, before the visible image is transferred, the surface of the photosensitive plate is charged uniformly by a corona discharge, and then when the copying material is pressed onto the surface of the photosensitive plate, it is possible to obtain excellent transfer of the image.

The reason for this is not apparent yet, but when the primary charge in the static image forming process is positive, and the charge of the corona discharge before transfer of the image negative, it can be considered in the same manner as when a DC secondary corona discharge is carried out simultaneously with the original image irradiation. But when the charge caused by the corona discharge before the transfer of the image is positive, the negative charged toner is charged positive by the positive corona discharge, and it is considered to be expelled against the positive charge on the insulating layer to accelerate transfer of the image.

Of course, when the secondary corona discharge is direct current, the charge before the transfer of the image is not necessary, but it is possible to produce an even better result if it is carried out before the image is transferred.

The copying material laying over the photosensitive plate is tightly adhered on the surface of the insulating layer because the voltage of the static image is high on the insulating layer. Therefore, after completion of image transfer, peeling off the copying material from the photosensitive plate is impossible by only jetting air thereagainst as is done in the conventional Xerox system. However, the surface of the photosensitive plate of the device of the present invention is a hard, durable insulating layer, and therefore the copying material can be peeled off forcibly by a scraping member, and at the same time by jetting air thereagainst.

Cleaning of the surface of the photosensitive plate is complicated by remarkably high voltage of the static image formed on the surface of the insulating layer of the photosensitive plate. This is particularly true because the charge is not reduced when the image is formed. Thus, if removal of remaining developing agent is tried by the friction of a fur brush driven at a high speed as in conventional devices, the insulating layer is charged because its high resistivity, and the developer is adhered thereon even more tightly. Cleaning is thus not possible. However, when cleaning is carried out while imparting an appropriate bias voltage between the photosensitive plate and fur brush, it does become possible.

On the other hand, since the surface of the photosensitive plate, i.e. the insulating layer, has high physical strength, there is no fear that the surface of the photosensitive plate will be damaged, even if rubbing is carried out under comparatively strong pressure.

Therefore, in the device of the present invention, the cleaning member is formed of a highly elastic or resilient material, such as rubber, synthetic resin or the like, and the cleaning is carried out by rubbing the surface of the insulating layer while applying appropriate pressure thereon. Excellent cleaning is attained and, at the same time, it is not necessary to employ high speed rotation. Because of this feature, the device becomes simple and can be produced at low cost, which can be accounted to be an advantage of the invention. Needless to say, this method cannot be applied to the photosensitive plate of the conventional type wherein the static image is formed on the photoconductive layer because the surface of the photoconductive layer will be damaged by the friction of the elastic body.

In carrying out the cleaning process in accordance with the present system, the elastic cleaner can be made conductive, and a voltage of polarity opposite to that of the remaining developer can be applied to the cleaner, so that the remaining developer is attracted statically onto the cleaner. This produces an even better effect. In accordance with another aspect of the present invention, it is possible to carry out the printing operation while reading the original copy during the copying process. In other words, it is possible to produce a novel reader-printer according to which it is not necessary to change the device in either case of reading or printing. This is because when the corona discharge is applied at the same time as the original image is irradiated, a leaking light of around 10 lux is permissible. The static image is formed on the surface of the highly insulating layer by making use of the charge trapped strongly within the photoconductive layer, and the static contrast is not reduced. It is thus possible to form a static image having static contrast in excess of 500 v.

In conventional reader-printers, whether the photosensitive plate is of the silver salt system or the Carlson process type, when leaking light projected from the reader portion is present during the exposure process, a foggy image or extreme deterioration of density may result. It is thus impossible to read and print at the same time.

Therefore, reading is done in a conventional reader-printer by inserting the film with a movable reflecting mirror set at a predetermined reading position. Thereafter, by rotation or transfer of the mirror the light image of the film is projected onto the photosensitive plate for printing. It is necessary to completely cut off the leaking light from the reader portion during printing. Since the reflecting mirror is large, it is necessary to prevent vibration or bending during and after movement, so a large protective frame is necessary. This involves a large, high precision driving mechanism. This inevitably increases cost of production, and the operation thereof is complicated. Furthermore, the speed for copying operation is reduced because of the time required for the movement of the reflecting mirror.

However, in accordance with the device of the present invention, even if there is more or less leaking light present, the printed image is still good. It is thus possible to use a fixed half mirror (i.e. semi-silvered) in place of the movable, fully reflecting mirror of the conventional devices. The reader-printer of the present invention thus has none of the drawbacks of the conventional devices.

A general object of the present invention is to provide an electrophotographic copying device effective to carry out the novel processes for forming the static image as described in the above-noted copending applications.

Another object of the present invention is to provide an improved electrophotographic copying device which is capable of forming a static image, developing the same, transferring the image into copying material and cleaning the transfer surface.

A further object of the present invention is to provide an effective charger capable of charging a photosensitive plate at the same time as the irradiation of the original image.

A still further object of the present invention is to provide novel fur brush and magnetic brush developing means effective for the device of the present invention.

Another object of the present invention is to provide press-transferring means which does not require the application of an electric field from outside and the precharge image means which impart corona discharge before the transfer of the image is carried out.

Yet another object of the present invention is to provide novel cleaning means for cleaning the surface of the photosensitive plate.

Still another object of the present invention is to provide novel means for automatically peeling off the copying material from a photosensitive plate.

A still further object of the present invention is to provide a novel electrophotographic copier wherein reading and copying can be carried out simultaneously.

A further object of the present invention is to provide a novel electrophotographic copier wherein the photosensitive plate may be shaped in a drum form or in a plane form.

The above and other objects and advantages of the present invention will become clear from the following description of several embodiments thereof, which will be described with reference to the attached drawings, in which:

FIG. 3 is a perspective view, partially cut away, showing a portion of the internal mechanism of the embodiment of FIG. 2;

FIG. 4 is a diagram showing the optical system of the same embodiment;

FIG. 5 is a perspective view of the left half portion of the device for forming the static latent image;

Figure 1:
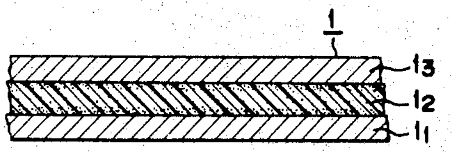
FIG. 1 is an enlarged, cross-sectional view of the photosensitive plate used in the device of the present invention.

The photosensitive plate used in the device of the present invention comprises, as shown in FIG. 1, three layers prepared by forming the photoconductive layer $1_2$ on the conductive base $1_1$, and by forming the translucent, highly insulating layer $1_3$ on the photoconductive layer $1_2$. Layer $1_3$ is a material of high wear resistance having a smooth surface.

It is noted that, as used herein, "translucent" means transparent, semi-transparent, or translucent to activating (i.e. actinic) radiation.

As the base $1_1$ of the photosensitive plate, paper with metal plate or metal foils such as Al adhered thereon may be used. Humidity absorbing paper is preferred. The base can be formed of other insulating materials or may be similar to the translucent insulating layer $1_3$ in place of said conductive base. In such a case, the photosensitive plate is used by placing the same on the conductive supporter.

As the translucent, insulating layer $1_3$, fluorin resin, polyester resin, polyethylene resin, polypropylene resin, polycarbonate resin, acryl resin, vinyl resin, epoxy resin or the like can be used, and Mylar, Teflon, Vinylon (trademarks) or the like are most appropriate for the purpose, and they are used in the thickness ranging from 10 to 50$\mu$.

As the photoconductive layer $1_2$, amorphous selenium, CdS, CdSe, CdTe, ZnO, ZnS, InSb, Te, Se, and organic semi-conductors or the like can be used. It is not necessary to bind charge directly on the photoconductive layer, and therefore, it is possible to use high sensitivity photoconductors. The sensitivity of the photosensitive plate is therefore remarkably high. Thus, when the photoconductor is an n-type semi-conductor, it is preferable that the polarity of the primary charge for forming the static image should be positive, and in the case of p-type semiconductors, it is preferable that it should be negative.

Figure 2:
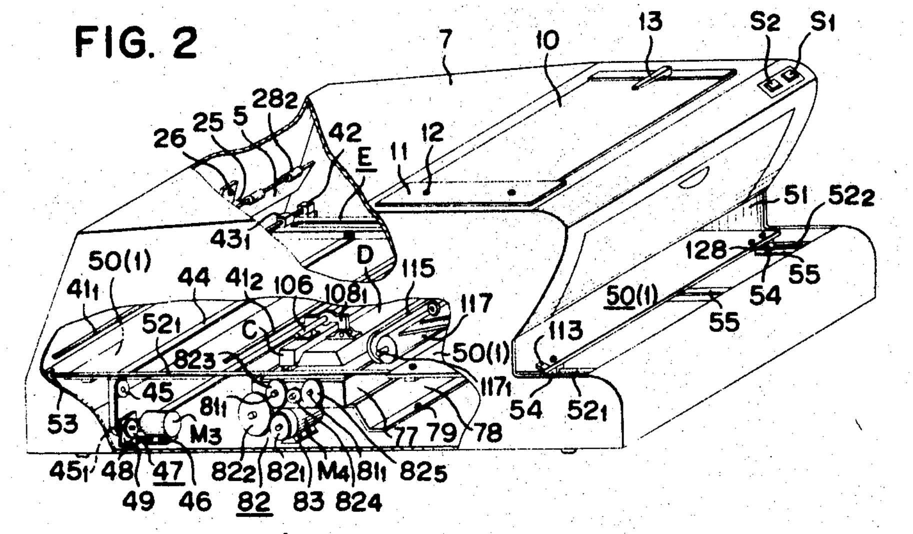
FIG. 2 is a perspective view, partially cut away, of an embodiment of the device of this invention, wherein the photosensitive plate is made in the form of a plane board, and is moved reciprocatingly in the horizontal direction.

FIG. 2 and FIG. 3 show the electrophotographic copier of the present invention wherein the photosensitive plate is in a plane, and is reciprocatingly moved in the horizontal direction. The optical system thereof is shown in FIG. 4. The image of the original copy 2 (FIG. 4) is formed or projected on the photosensitive plate 1 in the static latent image forming portion through reflecting mirror 3, image forming lens 4, and reflecting mirror 5 to form the static latent image in accordance with the light rays of the original copy 2. Then the photosensitive plate is moved horizontally in the direction as is shown by an arrow *a* to the position 1', and the development and the transferring of the image are carried out. After the completion of these operations, the photosensitive plate is moved in the opposite direction as shown by arrow *a'*, during which time the copying paper is peeled off to transport the copying paper to the fixing portion. Thereafter the photosensitive plate is cleaned and returned to the static latent image forming portion.

A large rectangular opening 8 is provided on the upper surface of the front portion of the main body 7 of the device (on the right side in FIG. 2 and FIG. 3) and a transparent original copy receiver base 9, made of glass or synthetic resin, is inserted therein. The original copy is pressed thereon by the pressing plate 10 as shown in FIG. 2. The pressing plate 10 is fixed onto the main body 7 by means of a retainer 11 and screws 12. The pressing plate 10 is made of rubber cloth or the like, and by covering the whole surface of the original copy receiver base 9, light rays are prevented from leaking outside. A handle 13 is provided for opening and closing the pressing plate.

Two guide rails $\mathbf{14_1}$ and $\mathbf{14_2}$ are fixed onto the body 7 by bearings 15 across the body 7 with the space therebetween being a little larger than the width of the above mentioned original copy receiver base 9, and being right below the same. The illuminating means L composed of two shades $\mathbf{18_1}$, and $\mathbf{18_2}$, and the lamp *l* such as a fluorescent lamp or the like are provided with a space G between the frame plates $\mathbf{17_1}$, and $\mathbf{17_2}$, which are united to the moving guide pieces $\mathbf{16_1}$ and $\mathbf{16_2}$ fitted to the respective rails $\mathbf{14_1}$ and $\mathbf{14_2}$, and the original copy 2 is illuminated from below through the transparent original copy receiver base 9.

Flexible member 19, which is a rope, belt, chain or the like, has its respective end portions fixed on the central portion of the side surface of shades $\mathbf{18_1}$, $\mathbf{18_2}$ by means of the lock member 20. The flexible member 19 is suspended on the four guide rollers $\mathbf{21_1}$ and $\mathbf{21_2}$ (only two shown) fitted to body 7, and is also hung on drive pulley 24 which is interlocked to the motor $M_1$ fixed on the body 7 or the frame $\mathbf{7_1}$ inside the body 7 by means of the lock washer 22, and screws 23. By means of the rotation of motor $M_1$ the lamp is moved from the left side of the body 7 (on the front side in FIG. 3) to the right side of the body 7 (the rear side in FIG. 3), and the original copy 2 is scanned with light rays, and the backward movement thereof is attained by the reverse rotation of the motor $M_1$.

In order to lead the image of the original copy 2 illuminated by the illuminator L to the static latent image forming portion at the rear part of the device through the space G, the front reflecting mirror 3 and the rear reflecting mirror 5 are provided across the body 7 with an angle of about 45° to the copy supporter 9. Arms 25 are fixed onto the front and rear portions of the body 7 (the front portion being not shown in the diagram) by screws 26, and the shaft 27 is provided on the arm 25 (FIG. 3). The rear shaft rod is not shown in FIG. 3. The front mirror 3 is supported on the holder $\mathbf{28_1}$ and the rear mirror 5 is supported by the holder $\mathbf{28_2}$, and the respective holders are provided on the front shaft rod 27 and the rear shaft rod (not shown) in such a manner that the inclination angle thereof can be freely adjusted.

The lens 4 for forming the image is mounted on the center line of the front and rear portions of the body 7, for example, on frame $\mathbf{7_1}$ in FIG. 3.

Figure 6:
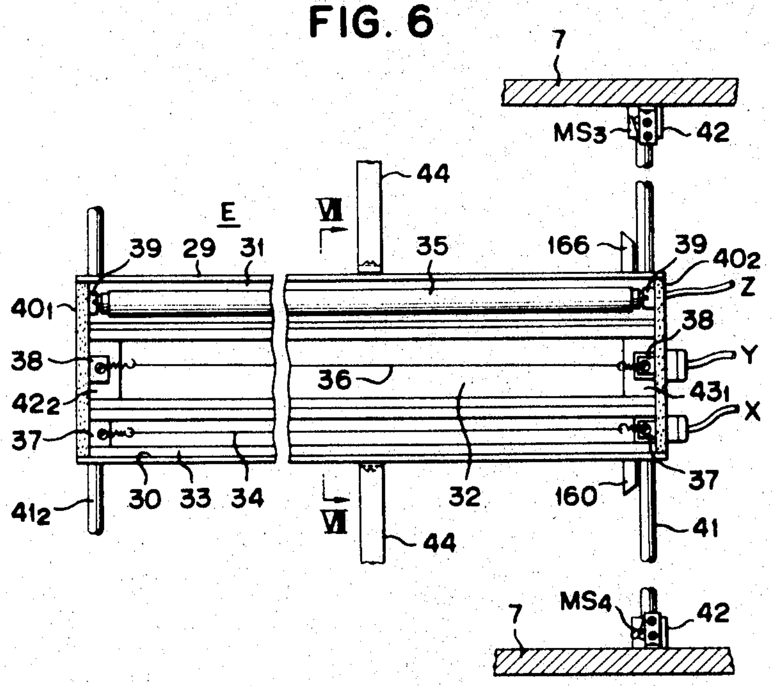
FIG. 6 is a plan view showing the lower portion of FIG. 5.
Figure 7:
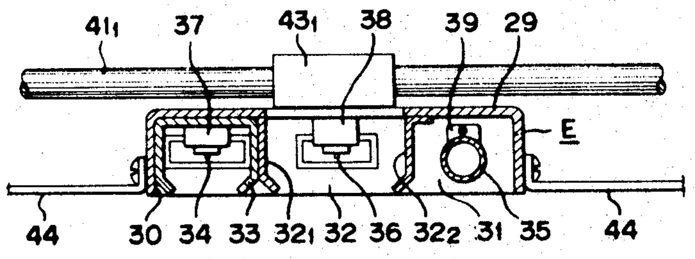
FIG. 7 is a diagram showing the transverse cross-section along the line VII—VII of FIG. 6.

The static latent image forming portion is provided below the reflecting mirror 5, and in FIGS. 5–7 the static latent image forming means E is illustrated. This comprises discharger chamber 30 for the primary charge, and light source lamp chamber 31 for all out illumination with the lower surface opened. These elements are provided at the lower surface of the frame plate 29, and the secondary discharge chamber and slit 32 for all out exposure is formed between the two chambers 30 and 31. The primary discharger is provided with a discharging wire 34 within the sealed case 33 inside chamber 30. A bulb 35 is contained in chamber 31, and a secondary discharge source 36 is provided in secondary chamber 32. The discharge source supporters 37, 38, and bulb socket 39, are insulatingly mounted on insulating frames $\mathbf{40_1}$, $\mathbf{40_2}$ on both sides of frame 29, and are respectively provided with lead wires X, Y, and Z.

The static latent image forming means E is moved towards the left side from the right side of the body 7 above the photosensitive plate 1 in the direction opposite to the direction of the movement of illuminating means L, when the photosensitive plate 1 stops at the position of the dotted line of FIG. 2. As soon as the static latent image formation is completed, it is moved back in the opposite direction. A pair of guide rails $\mathbf{41_1}$ and $\mathbf{42_2}$ are mounted on body 7 by the bearing 42 and moving pieces $\mathbf{43_1}$ and $\mathbf{43_2}$, fixed on frame 29, are supported on rails $\mathbf{41_1}$, $\mathbf{42_2}$. Each end of the flexible member 44 is connected to the central portion of frame 29, and flexible member 44 is supported on the three guide rollers 45 (two of which are not shown) fixed onto body 7 and two driving rollers $\mathbf{45_1}$. The motor $M_3$ fixed onto body 7 by the screw 46 is interlocked to driving rollers $\mathbf{45_1}$ through a train of speed reducing gears 47, and by the normal as well as reverse rotations of the motor $M_3$, the latent image forming means E is reciprocatingly moved. Bearing 48 (FIG. 2) supports the train of speed reducing gears 47 and drive roller $\mathbf{45_1}$, and stop screws 49 are also provided.

Figure 8:
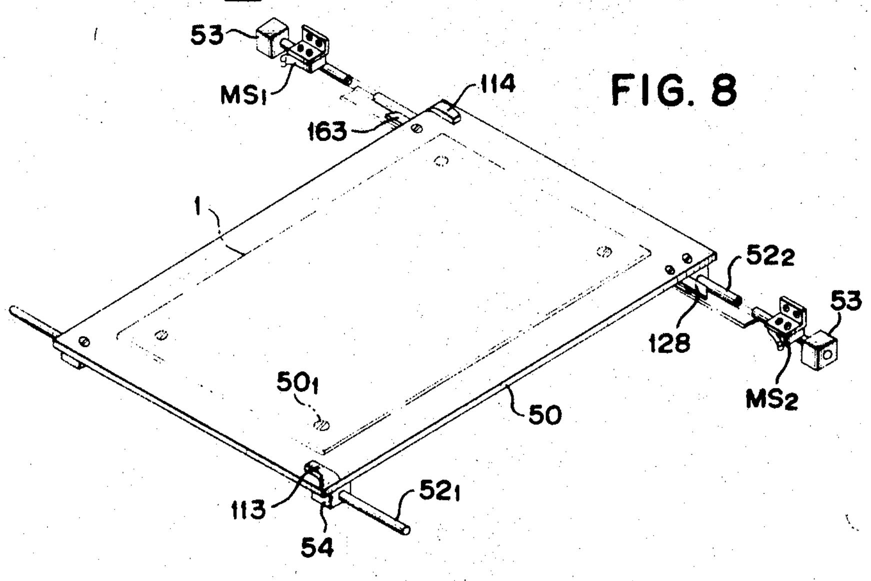
FIG. 8 is a perspective view of the photosensitive plate receiver base.

The photosensitive plate base 50 is shown in FIG. 8, and has photosensitive plate 1 thereon. It is reciprocatingly moved back and forth between the static latent image forming portion and the opening 51 (FIG. 2), where the image-bearing paper is discharged. This reciprocating mechanism is of the same type as that used for the static latent image forming means E and the illuminating means L. Namely, parallel rails $52_1$ and $52_2$ are provided in the front and rear directions on both right and left sides of body 7, and are fitted onto body 7 by means of the bearing 53. Sliding piece 54 is provided on the lower surface of receiving base 50, and a flexible member 55 is fitted onto receiving base 50; $56_1$ and $56_2$ are the guide rollers thereof. Drive motor $M_2$ drives the photosensitive plate receiver base, and shaft 57 is connected to the shaft of the motor $M_2$ through the train of speed reducing gears 58, and has the drive pulley 59 and drives the flexible member 55. Bearing 60 and stop screws 61, 62 are also provided.

As described in the foregoing, when the motor $M_2$ is rotated in the normal direction, receiving base 50 and the photo-sensitive plate 1 (fixed thereon by screws $50_1$) are moved forward from the position shown by the dotted line to the position shown by the solid line, and on the reciprocating path thereof, the developer D (shown in FIGS. 10–16) is provided right above the photosensitive plate 1 so as to have the same faced against the photosensitive plate 1.

Figures 9, 10, 11:
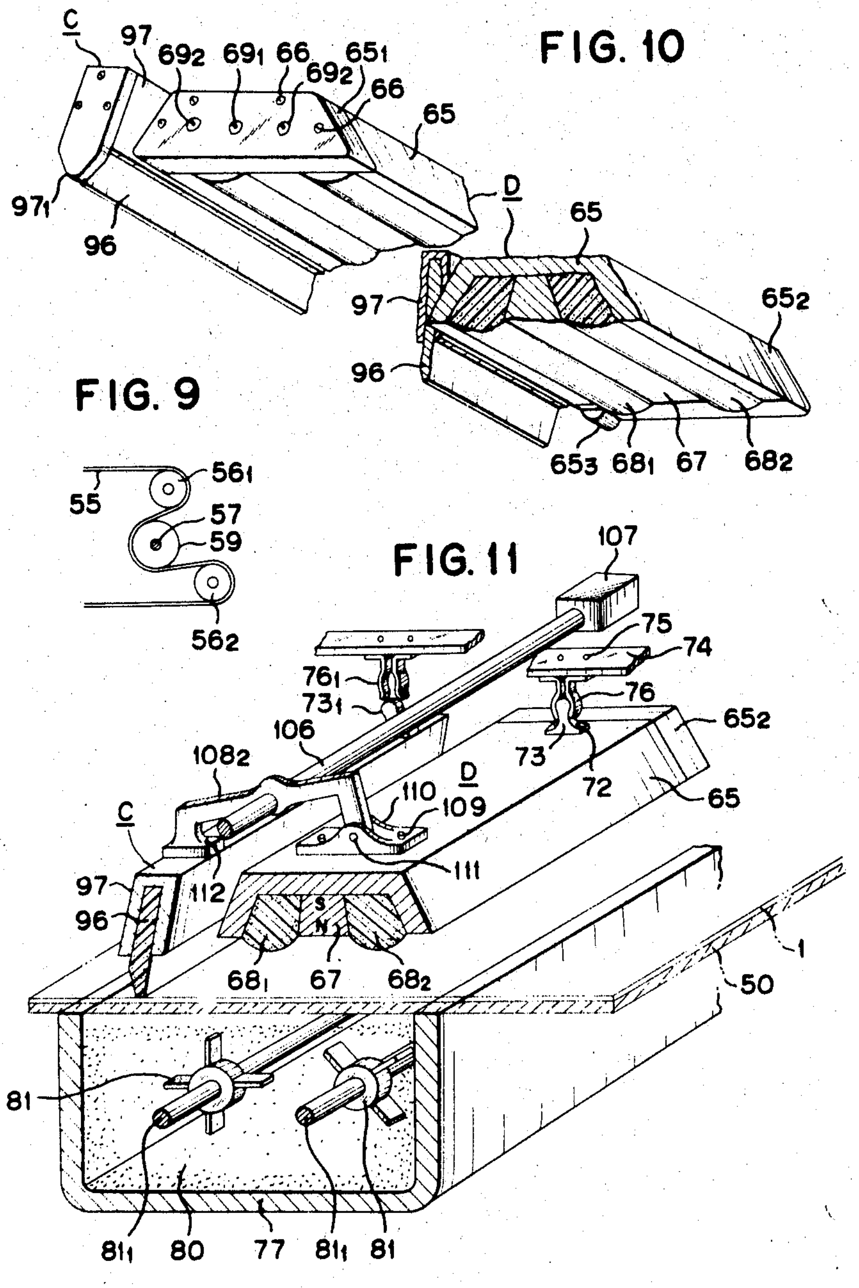
FIG. 9 is a diagram showing the reciprocatingly moving portion of the receiver base.
FIG. 10 is a perspective view, partially cut away, showing the underside of the developer and the cleaner.
FIG. 11 is a perspective view of the device of FIG. 10, mounted in the copier.
Figure 12:
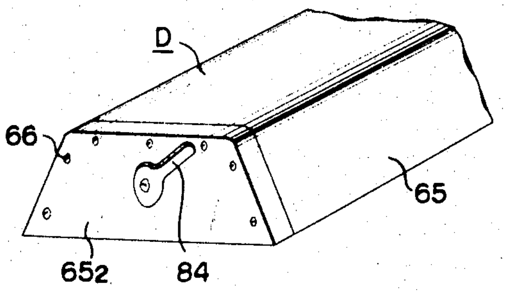
FIG. 12 is a perspective view showing a portion of the developer.

With reference to FIGS. 10 and 11, yoke 65 of the developer D, has the lower surface thereof opened, and at the opening portions on both right and left sides thereof are the end surface covers $65_1$ and $65_2$ made of non-magnetic materials and fixed by means of screws 66. In the internal hollow portion of yoke 65 the non-magnetic materials $68_1$ and $68_2$ are provided for controlling the magnetic path of the stick form permanent magnet 67. Magnet 67 and non-magnetic materials $68_1$ and $68_2$ are fixed onto the end surface covers $65_1$ and $65_2$ by means of screws $69_1$ and $69_2$. Yoke 65 is removably hung on body 7 by the hanger 73 fixed on the upper surface thereof by means of screws 72 and clip 76 fixed to frame 74 by means of the screws 75. As is shown in FIGS. 2 and 11, the developing agent box 77 is fixed onto body 7 by screws 79 and the supporting board 78 right below the lower moving surface of the photosensitive plate receiver base 50, so as to have the said developing agent box faced against the opening of the lower surface of yoke 65. Developer 80 is prepared by mixing the visualizing particles (toner) and a carrier having a specific resistance of over $10^8$ Ω-cm. so as to coat the surface thereof with an insulating film. The particles are placed in the developing agent box 77, and a stirrer 81 is rotated by the motor $M_4$ (see FIG. 2). A train of gears 82 consisting of gears $82_1$, $82_2$, $82_3$, $82_4$ and $82_5$ imparts rotations from the motor $M_4$ to the shaft $81_1$ of the stirrer, and screws 83 fix the motor $M_4$ onto body 7.

In operation, when the photosensitive plate 1 and the photosensitive plate receiving base 50 are not positioned for developing, a magnetic path is formed through both ends of the yokes $65_1$, $65_2$, and developer 80 within the developing agent box 77 is attracted by magnet 67 and a magnetic brush is formed thereby. The moving photosensitive plate 1 is subjected to friction against toner which is frictionally charged and the static image is developed thereby.

Figure 13:
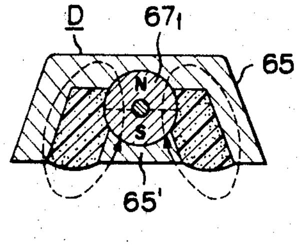
FIG. 13 is a horizontal cross sectional view of FIG. 12.
Figure 14:
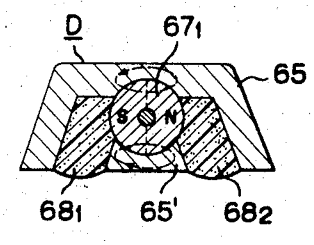
FIG. 14 is a horizontal cross sectional view of the developer of FIG. 13 in the cleaning position.

Developing agent box 77 is removable through an opening (not shown) provided on the right side wall of the body 7 so that developer can be added as required. It is also necessary to remove developer adhered to the developer D. For this purpose, as shown in the diagrams of FIG. 13 and 14, the magnet 67 is formed as a round rod and north and south poles are set on the symmetrical positions on the diameter. To clean the developer, poles are rotated by an angle of 90° with the handle 84 (FIG. 12) from the outside of the end surface cover $65_2$, and the north pole and the south pole are turned cross-wise so that the magnetic path will go within the yokes 65 and 65′, and no magnetic field will be produced outside thereof. Developer will then fall off.

Figure 15:
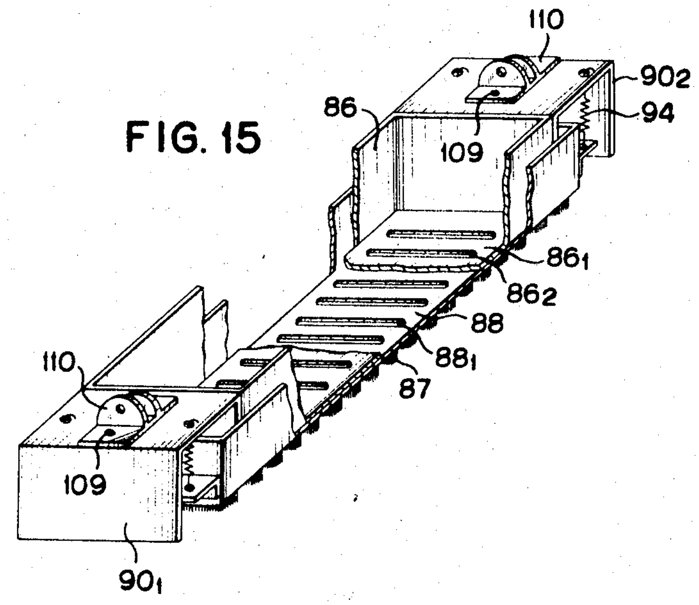
FIG. 15 is a perspective view, partially cut away, of a modified embodiment of the developer.
Figure 16:
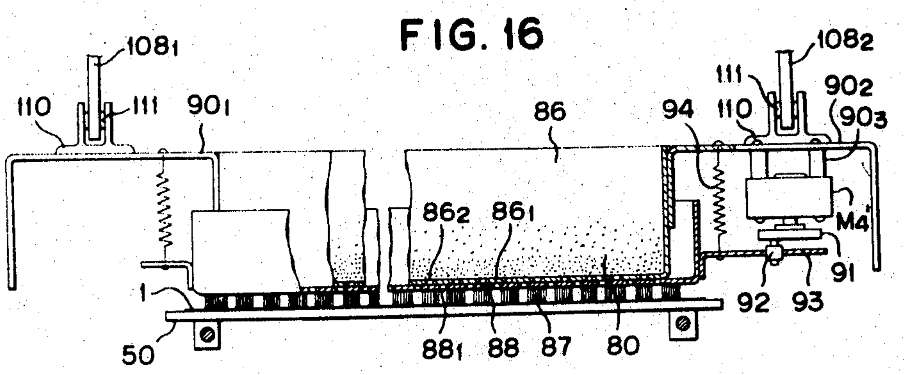
FIG. 16 is a vertical cross sectional view of FIG. 15.

FIGS. 15 and 16 show a modification of the developing means. The developing box 86 is hung down above the photosensitive plate 1 in the same manner as in the case of the above-mentioned yoke 65, perpendicularly to the direction of the reciprocating movement of the photosensitive plate 1. A fur brush plate 88 with fur brush 87 pointed downwardly is hung on the lower surface of the bottom $86_1$. If rabbit or badger fur is used, they must be refined before they are employed. It is also possible to paste the fur on the plate 88. Small holes or grooves $86_2$ and $88_1$ are provided on bottom $86_1$ and plate 88, respectively spaced from brush 87. The plate 88 of fur brush 87 is placed so that when developing is not being carried out, the holes $86_2$ and $88_1$ are not in registration. When developing is carried out, the motor $M_4'$ (fixed on the lower surface of the supporting frame $90_2$ of the developing box 86 with the bracket $90_3$) is rotated to drive eccentric plate 91, and the rotation is transmitted to rod 93 having the eccentric pin 92 provided on plate 88, and fur brush 87 is reciprocatingly moved against the direction of the photosensitive plate 1, and the developer which falls at the time when the holes $86_2$ and $88_1$ are in register is brushed on the photosensitive plate by means of brush 87, to carry out the developing.

In operation, fur brush 87 works as the carrier, so toner alone can be used as the developer. As mentioned above, furs of a rabbit or a badger can be used or human hair, synthetic fibers or the like can be used, provided that whatever is used has a specific resistance over $10^8$ Ω-cm. The length of the fiber should be adjusted so that when the fur touches the photosensitive plate, they should be bent, as toner falling from hole $88_1$ should not fall on the photosensitive plate directly. The advantage of this embodiment is that toner adhered on the white portion of the image on the photosensitive plate, which could cause fogging, is removed by the fur brush by means of triboelectricity (i.e. static charge) between the fur brush and the photosensitive plate. A coil spring 94 is used for hanging the fur brush plate 88.

The photosensitive plate 1 on base 50 is continuously advanced while receviing the above mentioned developing treatment, until it arrives at the image transferring position D. When the transferring of the image is complete, it is cleaned and brought back to the static latent image forming position, where it stops.

In FIG. 2, C stands for the cleaning means, and the detailed explanations thereof are given in FIGS. 10, 11, 17 and 18. A plate form cleaning plate 96 is fixed onto the holder 97, the plate form cleaning plate 96 being obtained by wrapping the elastic body, or hard core such as rubber or synthetic resin or the like with a cloth with cushion material in between the rubber or synthetic resin and the cloth. The fixed plate form cleaning plate 96 slidingly rubs the surface of the insulating layer $1_3$ on the upper surface of the photosensitive plate 1 to remove the toner which remains after the transferring of the image, because of the durability of the photosensitive plate to effect perfect cleaning by imparting a much stronger frictional resistance than can be used in the Xerox® system.

Figure 17:
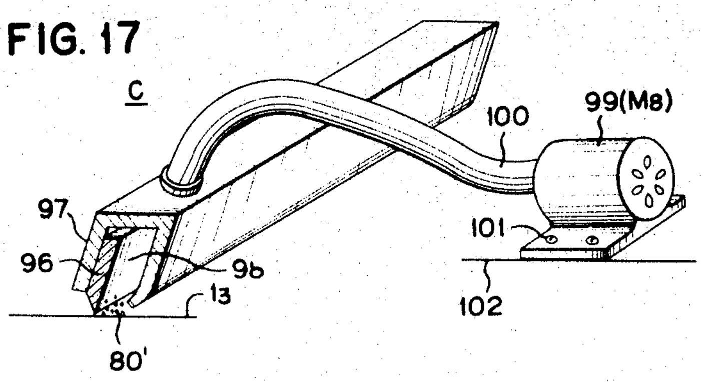
FIG. 17 is a perspective view showing an embodiment of toner recovering means provided for recovering the toner which is scraped off the photosensitive plate.

The toner 80′ which has been removed from the plate falls into the toner box 77 after the photosensitive plate 1 and the base 50 have passed, but when a large amount of toner is retained at the end portion of the cleaning plate 96, there is a tendency for part of the same to be pinched between the cleaning plate 96 and the photosensitive plate 1. It is therefore preferable that the toner be recovered as quickly as possible. As shown in FIG. 17, a space 98 can be provided between the cleaning plate 96 and the holder 97, and air in the space taken out by means of pump 99 through the pipe 100. Recovered toner is collected in a recovery box (not shown) provided between the pump 99 and the pipe 100, and is moved appropriately into the developer container. Screws 101 fix the pump 99 onto the frame 102.

Figure 18:
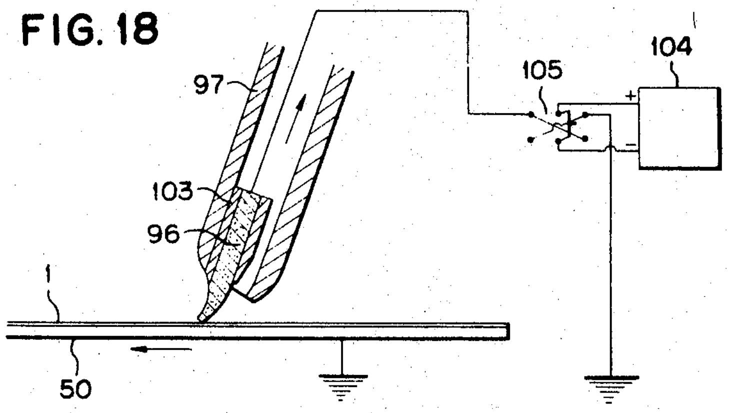
FIG. 18 is a diagram showing the application of a voltage of the opposite polarity to the charge of the toner applied to the cleaning plate.
Figure 19:
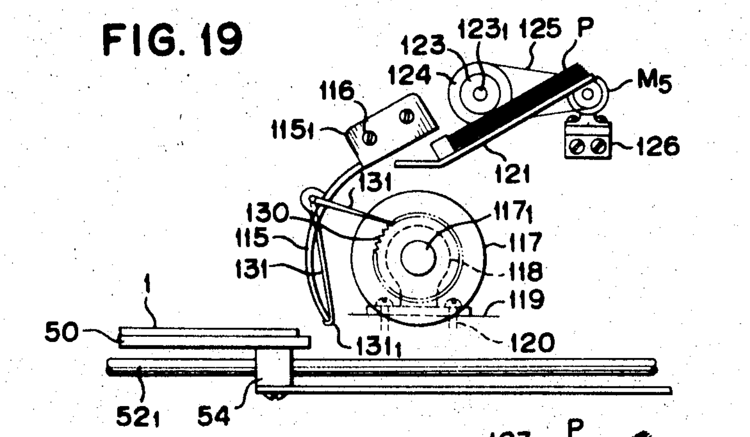
FIGS. 19–21 are cross sectional views showing operation of the transfer means.

The charge voltage of the static latent image of the device of the present invention is high, as mentioned above, and therefore the remaining toner is difficult to remove. Therefore, if necessary, conductive rubber can be used for the cleaning plate 96, as shown in FIG. 18, or a conductive film can be provided thereon. Holder 97 is insulated from the cleaning plate 96 by means of the insulating material 103, and a DC voltage of around 300 to 500 v., of the polarity opposite to that of the toner charge, is imparted from the electric source 104. The toner is thus removed by electric attraction. A switch 105 is for changing polarity.

The cleaning means C functions when photosensitive plate 1 is returned, and the developing means D functions when plate 1 is advanced. The conversion of function between cleaning and developing is carried out mechanically in interlocking relation to the reciprocating movement of the photosensitive plate receiver base 50. In particular, the supporting shaft 106 is fixed onto frame 7 by the bearing 107 across the body 7, as shown in FIG. 2 and FIG. 11. Hangers $\mathbf{108_1}$ and $\mathbf{108_2}$ are provided on the right and left sides of the supporting shaft 106. The receiving mmeber 110 is fixed onto the upper surface of developing means D by means of screws 109 and is hung on the front portion of the hanger by the shaft 111. The rear portions of the hangers $\mathbf{108_1}$ and $\mathbf{108_2}$ are fixed onto cleaning means C by the screw 112, and the developing means D and the cleaning means C are thus connected in a seesaw manner, so that in case one of them is elevated, with the shaft 106 as the fulcrum, the other is lowered. As shown in FIG. 11, in case the developing means D is elevated (no developing operation is carried out away from the photosensitive plate 1), the hanging means 73, the top portion of which is enlarged, is held by the clip 76 thus retaining developing means D at this position. On the contrary, in case the cleaning means C is removed from the photosensitive plate 1, the clip 76 and the hanger $\mathbf{73_1}$ keep the cleaning means C at the raised position. Hangers 76, 73, $\mathbf{76_1}$, $\mathbf{73_1}$ are provided at three places, i.e., on the right, left and in the center, but in the diagram of FIG. 11, only one (on the right) is shown.

On the upper surface of the photosensitive plate base 50, as is shown in FIG. 8, the projections 113 and 114 are provided. When the photosensitive plate is moved, projection 113 pushes up the lower surface $\mathbf{97_1}$ of the side plate of the cleaning means C (FIG. 10) and the cleaning means C is retained by the hangers $\mathbf{73_1}$ and $\mathbf{76_1}$. At the same time, the developing means D is lowered to the developing position by releasing hangers 73 and 76. When receiver base 50 is returned after the image transferring operation is finished, the projection 114 pushes the projecting portion $\mathbf{65_3}$ (FIG. 10) of the end portion cover $\mathbf{65_1}$, and the developing means D is lifted to the non-operational position, and cleaning means C is lowered to the operational position. Operations are carried out in the same manner with developing means of FIGS. 15 and 16.

The image transferring process, as carried out immediately after the developing process at the time when the photosensitive plate 1 is moving is hereinafter explained with reference to FIGS. 19–22. An arc-shaped guide plate 115 is attached to body 7 by the ear piece $\mathbf{115_1}$ fixed with the screw 116 on the right and left sides. Adjacent plate 115, the shaft $\mathbf{117_1}$ of the press-roller 117 is fixed onto the frame 119 by the screw 120. The copy paper receiver base 121 is tilted towards guide plate 115 aslantly above press-roller 177, and is fixed onto the body 7 by means of the screw 122 and the ear piece $\mathbf{121_1}$. A paper feed-roller 123 is placed on the copying paper P laid on the receiver base 121, and rotation of the motor $M_5$ is transmitted to the pulley 124 on the shaft $\mathbf{123_1}$ by means of the belt 125. The motor $M_5$ is mounted on the base 126 on body 7.

Figure 20:
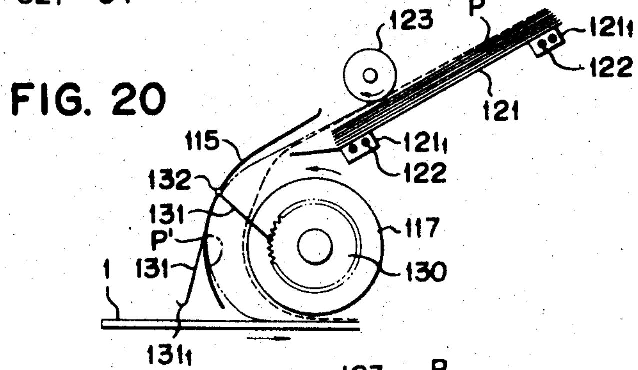
Figure 21:
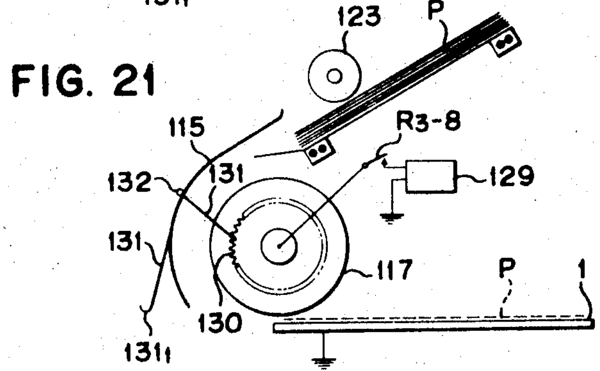
Figure 23:
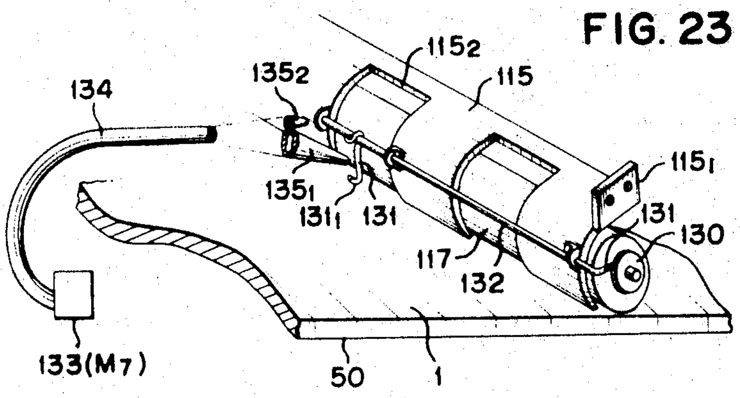
Figure 24:
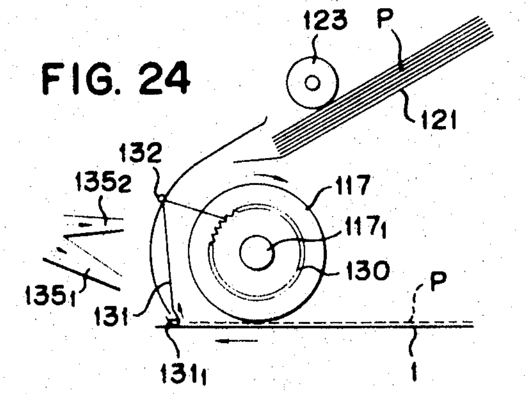
FIGS. 24 and 25 are diagrams showing operation of the devices of FIGS. 22 and 23.

A sheet of copy paper P is first forced against plate 115 by roller 123, and the end portion thereof arrives at the path of the photosensitive plate 1 as is shown by P′ of FIG. 20. When the photosensitive plate 1 moves under roller 117, paper P is forced under the press-roller 117, and both the photosensitive plate 1 and the copying paper P are closely adhered to each other. The roller 117 is rotated by means of friction against plate 1. As receiver base 50 and photosensitive plate 1 continue to move, the assembly is removed from press-roller 117, as shown in FIG. 21, and the projection 128 (FIG. 8) provided on the receiver base 50 operates microswitch $MS_2$ fixed on the body 7, causing rotation of the motor $M_2$ for driving the photosensitive plate to reverse. The powder image is transferred to the copy paper by press-adhesion with the photosensitive plate 1 as shown in FIG. 24. On the return movement of receiver base 50, the photosensitive plate 1, and copy paper P, copy paper P is peeled off and sent to the fixing process. The mechanism therefor is explained with reference to FIGS. 22–25.

Figures 25, 26:
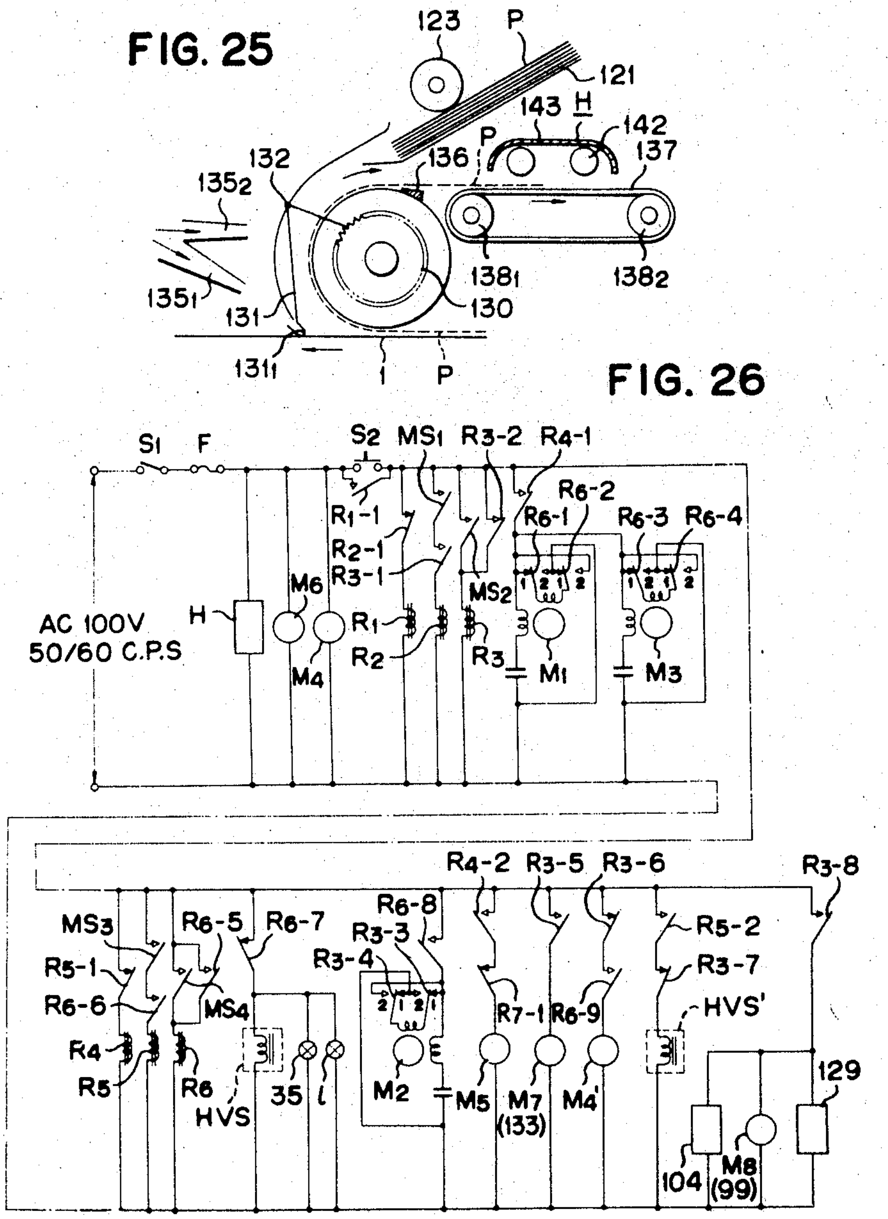
FIG. 26 is a circuit diagram for the embodiment of the invention shown in FIG. 2.

During the return movement of base 50, the press-roller 117 is rotated in the direction shown by the arrow in FIG. 24, and the saw-toothed gear 130 fixed on the shaft thereof, $\mathbf{117_1}$ is also rotated in the same direction. The V-shaped lever 131 fitted thereto, which was in the tilted or escaped state as is shown in FIG. 20 during paper feeding so as not to disturb the powder image on the photosensitive plate 1, is raised by rotation of gear 130, with the shaft 132 on guide plate 115 as the fulcrum. The lower end $\mathbf{131_1}$ of lever 131 touches photosensitive plate 1 and peels the copy paper P off. Paper P is guided towards the guide plate 115, and at this time blower 133, shown in FIG. 23, is turned on, and air is jetted against the back of the copying paper P from the nozzles $\mathbf{135_1}$, $\mathbf{135_2}$ at the ends of the conduit 134 connected to blower 133, through the openings $\mathbf{115_2}$ in guide plate 115. Copy paper P is thus pressed against the press-roller 117, and in accordance with the rotation thereof, is guided as shown in FIG. 25. At the upper portion of said roller, it is transferred onto the conveyor 137 of the fixing means H along the guide plate 136 fixed on body 7.

Figure 22:
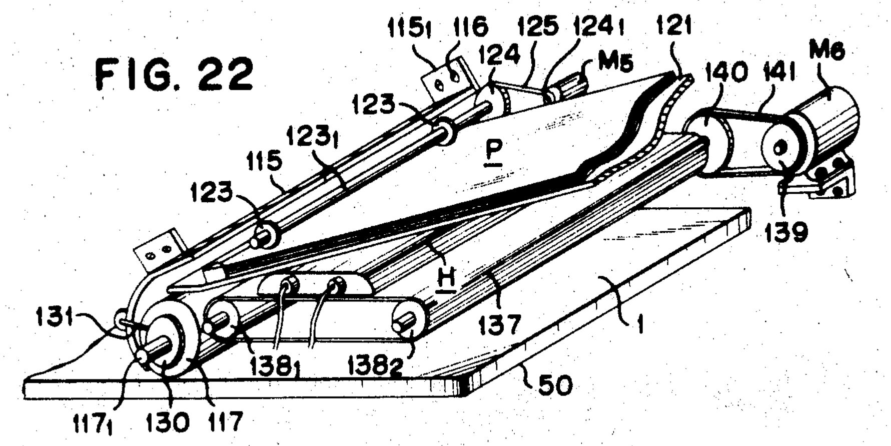
FIGS. 22 and 23 are perspective views of the fixing mechanism and the mechanism for peeling off of the transfer paper.

Fixing means H, as shown in FIGS. 22 and 25, is located below the copy paper receiver base 121, and comprises conveyor 137 and the heater H. Horizontal conveyor 137 is suspended between the rollers $\mathbf{138_1}$ and $\mathbf{138_2}$, mounted in parallel with body 7 in the front and rear directions, by means of bearings (not shown). Motor $M_6$ drives conveyor 137 through the pulleys 139, 140, belt 141 and roller $\mathbf{138_2}$. Copy paper P is heated by the heater H, comprising an infrared ray lamp 142 and a cover 143, and the resin toner is melted on the copy paper P and the image is fixed.

The paper P bearing the image is discharged from the device at the outlet opening 51 (FIG. 3) on the front surface of the body, by means of the conveyor 137.

Figure 27:
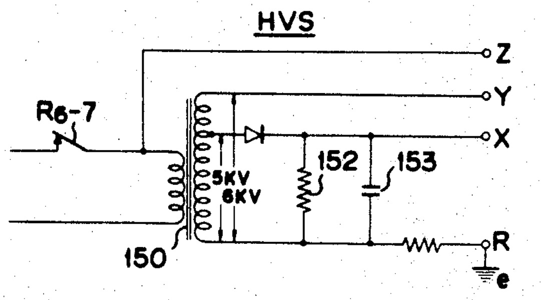
FIGS. 27 and 28 show high voltage electric source circuits of the static image forming portion of the invention, FIG. 27 showing the case wherein the alternating corona discharge is used for the secondary charge and FIG. 28 showing the circuit when direct current is used for the secondary discharge.
Figure 28:
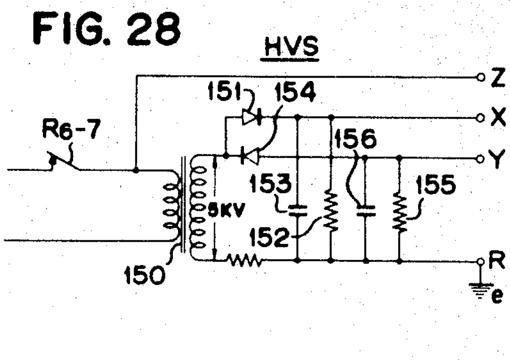

Electrical circuitry for operating the device is illustrated in FIGS. 26–28.

FIGS. 27 and 28 show the high voltage source (HVS) circuit for carrying out the charging process of the static latent image forming portion, and correspond to the boxes labelled HVS and HVS′ in FIG. 26. The electric source (50–60 c.p.s., 100 v.) is supplied to the primary coil of a transformer 150 to generate a voltage of about 5 kv. on the secondary coil. By means of the rectifier 151 and the parallel R-C network 152, 153, it is converted into direct current, and the output terminal X is connected to the terminal X of the primary charger of the static latent image forming portion (FIGS. 5 and 6). In the embodiment shown in FIGS. 26 and 27, the photosensitive plate 1 is presumed to be a P-type semiconductor, and the polarity of the input terminal is set up to be positive. In this case, the other pole R of the electrical source is grounded. In the case where the alternating corona discharge is carried out for the secondary charge, the secondary voltage of about 6 kv. is generated as shown in FIG. 27, and is supplied to the secondary discharge source 36 through the terminal Y. In case the secondary charge of direct current of opposite polarity is carried out, as shown in FIG. 28, the direct current, of the opposite polarity obtained by the rectifier 154 and the parallel R-C network 155, 156, is supplied to the secondary discharge source 36 through the terminal Y.

When the electric source switch $S_1$ (FIGS. 2 and 26) is closed, electricity is supplied through the fuse F to the heater H for fixing the powder image (FIGS. 22 and 25), the conveyor motor $M_6$ and the motor $M_4$ for stirring the developer (FIG. 2), and they start their respective operations. These are always operating even when the start switch $S_2$ is "on." The start switch $S_2$ (FIGS. 2 and 26) is then closed, and the relay $R_1$ is operated by the constant closing contact $(R_2-1)-R_1$, and the contact $R_1-1$ is closed, short-circuiting start switch $S_{22}$ so that the circuit is maintained when the button is released. At the same time, the relay $R_4$ is magnetized through the constant closing contact $R_5-1$ to close the contacts thereof $R_4-1$, 2, and therefore the electric current is passed to the following: $(R_4-1)$—the constant closing contact of $(R_6-1-1)$—Motor $M_1$—$(R_6-2-1)(R_4-1)$—$(R_6-3-1)$—Motor $M_3$ (or $M_6$)—$(R_6-4-1)(R_4-2)$—$(R_7-1)$—$M_5$.

In particular, the illuminator L drive motor $M_1$ (FIG. 3), the motor $M_3$ for driving the static latent image forming means E (FIG. 2), the motor $M_5$ for feeding paper (FIGS. 19 and 22) start rotating. At the same time, electricity is passed to the high voltage electric source HVS (FIGS. 27 and 28) through the constant closing contact $R_6-7$, and electricity is supplied to the primary discharge source 34 through the terminals X and Y, the secondary discharge source 36, to the all-out-exposure lamp 35 through the terminal Z, and to the illuminating lamp *l*.

Therefore, the original copy illuminating lamp L starts to proceed towards the right side of the body from the position of FIG. 3, and the latent image forming means E starts to proceed towards the left side of the body from the position of FIG. 2. The image of the original copy is formed on the photosensitive layer $1_2$ of the photosensitive plate 1 on the receiver base 50, in accordance with the optical system of FIG. 4, through the slit G of the illuminating means L, the mirror 3, lens 4, and through the exposure slit 32 of the latent image forming means E.

In other words, the static latent image forming means E is moved from the right to the left against the surface of the photosensitive plate 1 which is stopped at the rear portion of body 7, and then the primary charge is uniformly carried out on the photosensitive plate 1 by means of the corona discharge of 5 kv. D.C. by using the primary discharge source 34. Then the secondary charge by means of the discharge source 36, or the alternating corona discharge, and the illumination of the light rays are carried out simultaneously. Further, the all-out-exposure is carried out directly thereafter by means of the lamp 35. Said all-out-exposure is carried out in order to improve the contrast and the stability of the latent image.

By carrying out the above mentioned static latent image process against the photosensitive plate made of three layers (FIG. 1), the charge of the primary charge polarity remains at the dark place where no light is irradiated, on the surface of the insulating layer $1_3$, or the said charge is reduced and the charge of the same polarity as that of the secondary charge remains (depending on which arrangement is employed), and the surface potential difference between the light and dark places is 1,000 v. to 2,000 v. This value is remarkably large when compared with the several tens of volts to several hundred volts achieved with the Carlson process.

When the static latent image formation is completed as set forth above, the push piece 160 provided on the frame 29 (FIGS. 5 and 6) closes microswitch $MS_4$ fixed on the left side of the body 7, and the electric circuit is closed to operate the relay $R_6$, and the contacts thereof $R_6-1-9$ are moved in the opposite direction to that shown in FIG. 26. The drive motor $M_3$ of the above mentioned static latent image forming means E, and the motor $M_1$ for driving the original copy illuminating lamp are respectively converted to the reverse rotation circuit by means of the respective contacts $$(R_6-3-2)—(R_6-4-2)$$

$(R_6-1-2)$—$(R_6-2-2)$, and the above mentioned static latent image forming means E and the original copy illuminating means L are driven back. The electric source circuit of the static latent image forming portion is cut off by the contact $(R_6-7)$, as are the electric sources of the discharger for carrying out the primary charge, the secondary charge and the illumination of the all-out-exposure of the original copy. When push piece 160 releases the microswitch $MS_4$, the relay $R_6$ is retained in the closed position by means of the contact $R_6-5$, so the returning operation continues.

When the static latent image forming means and the original copy illuminating means (which are moved at the same speed the same distance) are returned to the original positions (FIGS. 2 and 3) the push piece 161 provided on the static latent image forming means on the opposite side of the pushing piece 160 (FIG. 6) closes microswitch $MS_3$ provided on body 7, and by means of $MS_3$—$(R_6-6)$—$R_5$ the relay $R_5$ is operated, and by means of the contact $R_5-1$ thereof, the circuit of the relay $R_4$ is opened, and the contacts $R_4-1$, 2 are opened, and the respective motors $M_1$, $M_3$, and $M_5$ for driving the original copy illuminating lamp L, the static latent image forming means E, and the paper feeding means are stopped until the start switch $S_2$ is closed. The diameters of the pulley 124, 124′ and the diameter of the roller 123 are so planned that the copying paper P is sent to the position P′ in FIG. 20 in the paper feeding means during the rotation of motor $M_5$.

Further, by means of the operation of the relay $R_6$, the contact $R_6-8$ is closed, and the motor $M_2$ (FIG. 3) is turned on by means of $(R_6-8)$—$(R_3-3-1)$—Motor $M_2$—$(R_3-4-)$—electric source, and moves the photosensitive plate receiver base 50 and photosensitive plate 1 placed thereon towards the front portion of the body 7 as soon as the above mentioned static latent image formation is completed.

During the time when the photosensitive plate is moving, development and the image transferring are carried out as mentioned above, and as soon as the photosensitive plate receiver base 50 arrives at the end point of movement, the push piece 128 (FIG. 8) provided at the front portion of the receiver base 50 closes microswitch $MS_2$ provided on body 7 (FIGS. 3 and 8) and the relay $R_3$ is operated by the circuit of $MS_2$—$R_3$—electric source. The contacts $R_3-1-8$ are switched in the opposite direction to that shown in FIG. 26, and through $(R_3-2)$—$R_3$, the circuit is maintained after $MS_2$ reopens. Photosensitive plate 1 is returned by means of the reverse rotation of the motor $M_2$, and the receiver base 50 is returned by $(R_3-5)$—$M_7$, and at the same time, the motor $M_7$ of the fan 133 for peeling off the paper is turned on. Copy paper P is peeled off by means of the movement of base 50, and is transferred to the fixing means as described hereinabove. Base 50 pushes up the developing means D by projection 114 during return movement, and in place thereof, the cleaning means C is lowered to its operational position. Remaining toner on the surface of the photosensitive plate is cleaned off, as described above. When base 50 returns to its original position at the static latent image forming portion, the push piece 163 (FIG. 8) on the rear portion of base 50 closes the microswitch $MS_1$, and by the circuit of $MS_1$—$(R_3-1)$—$R_2$—electric source, relay $R_2$ is operated, and the circuit-maintaining relay $R_1$ of the start switch $S_2$ is cut off by the opening of contact $R_2$—1, releasing the circuit-maintaining feature of switch $S_2$. The copying process is thus completed, and all of the above mentioned operations are stopped until the start switch $S_2$ is again closed.

Figure 29:
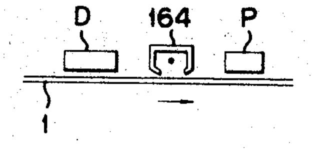
FIG. 29 is a diagram of an embodiment wherein the photosensitive plate containing the powder image is charged before the image transfer operation is carried out.

In the above-noted embodiment of the present invention wherein the A.C. corona discharge and the exposure are carried out simultaneously, development is carried out with the toner charged with a polarity opposite to the charge of the static latent image, to obtain a positive-positive image, and in this case the attraction between the powder image and the photosensitive static image is great, but the image transferring efficiency is low. In this case, it is possible to increase the image transferring efficiency remarkably by carrying the charge by means of a direct current corona discharger 164 to the photosensitive plate and the powder image between the image developing portion D and the image transferring portion P, as shown in FIG. 29.

In regard to the charge polarity of discharger 164, either can be used. If it is charged in the opposite polarity (+) against the charge of the powder image (−), the insulating layer $1_3$ is charged positively and the powder image is also converted to positive polarity, there is generated a repelling force between the two, and the image is easily transferred. If the charge before the transfer of the image is in the same polarity (−) as the charge (−) of the powder image, the powder image is charged negatively and the white portion (other than the powder image) on the insulating layer $1_3$ is also charged in the same polarity, and a repelling force is also generated.

In this embodiment, discharger 164 is placed between the developing means D and the copy paper feeding means, and is fixed onto body 7 facing the photosensitive plate 1. The electrical control supplying discharger 164 comprises the high voltage electric source HVS′ (FIG. 26) of a single polarity which is similar to source HVS (FIGS. 27 and 28). The circuit thereof is closed by the contacts $R_3$–7 and $R_5$–2 of the relays $R_3$ and $R_5$, to supply electricity to discharger 164 simultaneously with the start of movement of the plate.

Generally, in carrying out the image transferring operation, the back surface of the image transferring paper P is kept at the same polarity as that of the electric charge formed on the border layer between the insulating layer $1_3$ and the photosensitive layer $1_2$ of photosensitive plate 1. This makes it possible to carry out the image transferring operation effectively and easily, and as the means therefor, as shown in FIG. 21, a direct current voltage should preferably be imparted to the press-roller 117 from the electric source 129. The electrical control is supplied by means of contact $R_3$–8 on the relay $R_3$ and, if necessary, this also controls the direct current source 104 (FIG. 18) and the motor $M_8$ for driving suction fan 99 used when the cleaning operation is carried out in this manner. In FIG. 26, the electric sources 104 and 129 are D.C. sources having a rectifier and a smoothing device (i.e. a parallel R-C network).

In case a fur brush developing step is employed, stirring motor $M_4'$ (FIG. 16) is driven until the microswitch $MS_2$ is opened, i.e., at the time when the receiver base 50 starts its movement by means of the operation of the contacts $R_3$–6, and $R_6$–9 of the relays $R_3$ and $R_6$.

Figure 30:
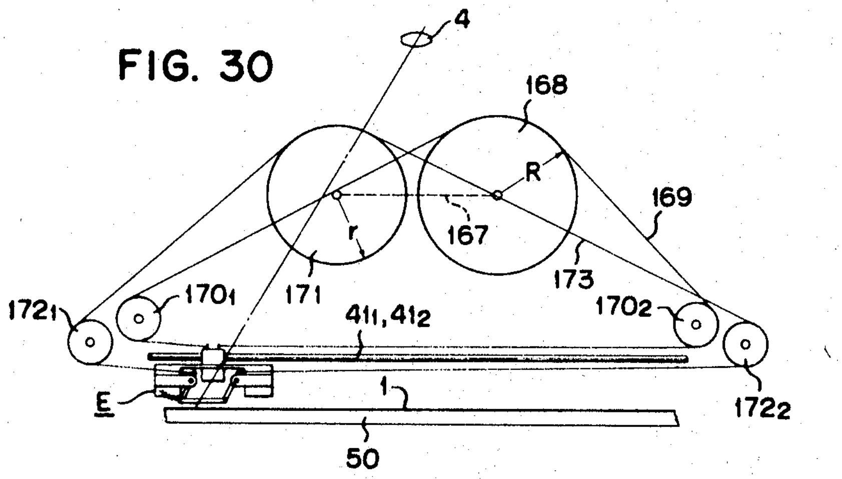
FIG. 30 is a diagram showing the front view of the device for preventing the shield plates of the discharger on both sides of the light path of the light source from coming into a part of the light path.
Figure 31:
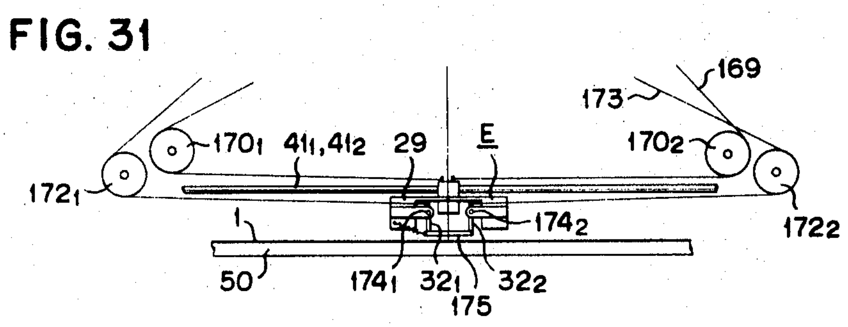
FIG. 31 is a diagram showing the side view of FIG. 30, with the latent image forming means located at the center portion.
Figure 32:
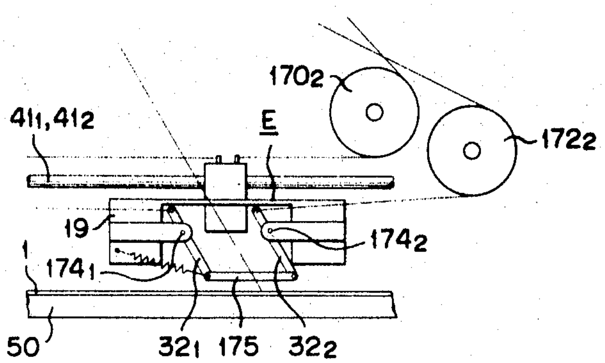
FIG. 32 is a diagram showing the front view of the device of FIG. 30, wherein the latent image forming means is on the opposite position.

FIGS. 30 through 32 illustrate another embodiment of the transmission mechanism for the static latent image forming means E. In accordance with this embodiment, a drive pulley 168 is provided on the horizontal shaft 167 which is rotated by drive motor $M_3$ (FIG. 2), and an endless belt 169 connected to the static latent image forming means E is placed over pulley 168 and guide rollers $\mathbf{170_1}$ and $\mathbf{170_2}$. The static latent image forming means E is moved thereby along rails $\mathbf{41_1}$ and $\mathbf{41_2}$. The starting, reversal, and stop operations are controlled in the same manner as described above in connection with FIGS. 2 and 6.

While the static latent image forming means E makes an exposure from the right to left extremities of plate 1, lens 4 is fixed and therefore, except at the moment when lens 4 is directly above means E (FIG. 31), shield plates $\mathbf{32_1}$ and $\mathbf{32_2}$ (FIG. 7) will shade some of the light rays as they are projected aslantly, and the degree thereof will be increased the more means E departs from the central position perpendicular to the vertical light axis. FIGS. 30 and 32 illustrate this.

In order to prevent this trouble, shield plates $\mathbf{32_1}$, and $\mathbf{32_2}$ are rotatably mounted on frame 29 by means of the shafts $\mathbf{174_1}$ and $\mathbf{174_2}$, and they are connected to each other by means of one or two rods 175 to form a parallel-link mechanism. By means of a pulley 171, on the same shaft 167 on which the pulley 168 is mounted, an endless belt 173, and guide rollers $\mathbf{172_1}$ and $\mathbf{172_2}$ a movement slightly different from that of the static latent image forming means is imparted to said rods. In other words, pulleys 168 and 171 are designed to have the relation of the radius $R>r$ (FIG. 30), and the amount of the movement of the parallel link mechanism is thereby more reduced than the amount of the movement of the static latent image forming means, so the exposure slit between the shield plates $\mathbf{32_1}$, and $\mathbf{32_2}$ is maintained parallel to the light axis. The position at each extremity is shown in FIGS. 30 and 32.

As noted above, the invention also includes a combined microfilm reader-printer embodiment, and this will now be described.

Figure 33:
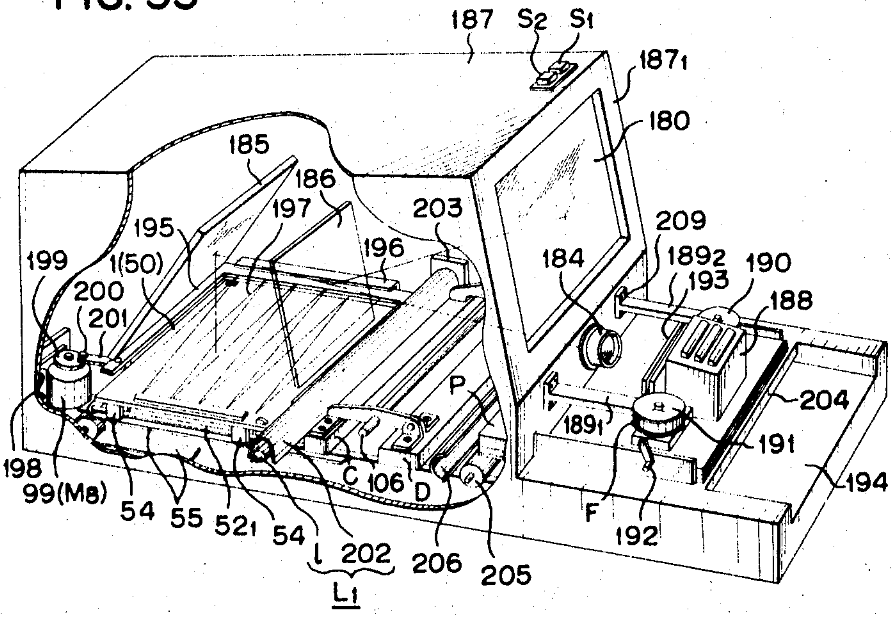
FIG. 33 is a perspective view, partially cut away, showing a micro-film reader-printer embodiment of the invention.
Figure 34:
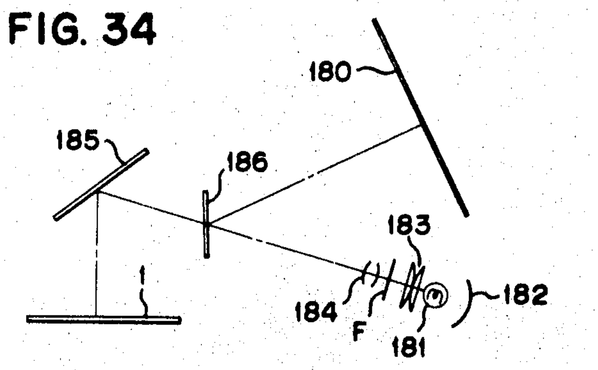
FIG. 34 is a diagram showing the optical system of the embodiment of FIG. 33.

FIG. 33 shows this embodiment, according to which the image on the microfilm F is projected on a screen 180, such as frosted glass, and while watching the projected image it is copied. The optical system thereof is shown in FIG. 34. The film F is projected onto the photosensitive plate 1 by using a lamp 181, reflector 182, condenser lens 183, projecting lens 184, and reflecting mirror 185. A translucent reflecting mirror 186 is located between lens 184 and mirror 185, and a portion of the projected light is guided to a screen 180 to form the image, from which it can be read.

Referring again to FIG. 33, a lamp house 188 is supported at a position in front of the body 187 but below screen 180 by means of brackets $\mathbf{189_1}$ and $\mathbf{189_2}$, and condenser lens 183 are located therein. A microfilm sending reel 190, a film pressing plate 193 are all provided on brackets $\mathbf{189_1}$ and $\mathbf{189_2}$, which is fixed on the body 187 by screws 209. Screen 180 is fixed on the surface of the front wall $\mathbf{187_1}$ of body 187, and projecting lens 184 is fixed at the lower portion thereof. Photosensitive plate 1 supported on receiver plate 50 is reciprocatingly moved between the static latent image forming portion, and copy paper is removed from opening 194 in the same manner as in the case of the embodiment of FIGS. 2 and 3. Flexible body 55 pulls it along guide rails $\mathbf{52_1}$, and $\mathbf{52_2}$ ($\mathbf{52_2}$ not shown), together with moving piece 54. The whole image of the film F is enlarged and projected at once onto the photosensitive plate 1. Discharger frame 195, made of insulating material, is large enough to cover the whole surface of the photosensitive plate 1, and is attached to body 187 by supporter and guide rails 196 directly above plate 1 in the static latent image forming position. Discharger frame 195 is mounted so that it can be moved back and forth a little to prevent the non-uniform charging. Discharge wires 197 are provided within the frame 195, and the direct current voltage for the primary charge is applied to wire 197 to act on the photosensitive plate. During this time a crank plate 199 is rotated by motor $M_8$ (fixed on body 187 by the screws 198), and the frame 195 is vibrated horizontally by means of a pin 200 and rod 201.

Figure 35:
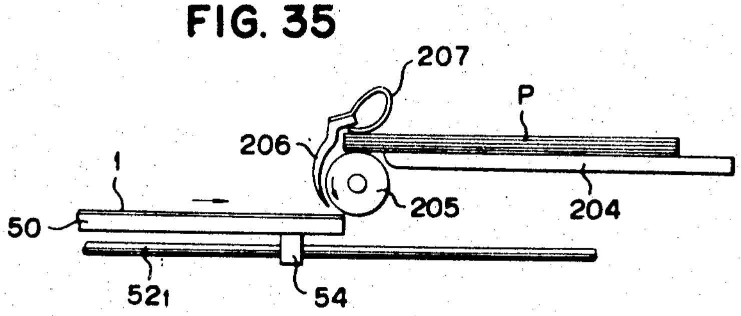
FIGS. 35 and 36 are diagrams showing the enlarged side view of the paper feeding mechanism and the transfer mechanism.
Figure 36:
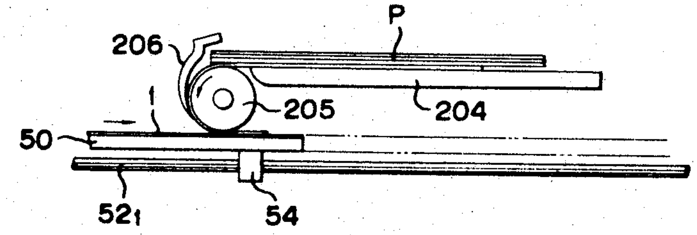

After applying the primary charge, the image is projected, and at the same time the high voltage direct current secondary charge, or alternating current corona discharge of polarity opposite to the primary charge, is applied to the discharge wires 197, and the static latent image is formed on the photosensitive plate 1. When this is completed, the photosensitive plate 1 starts to move, and the image is irradiated by total exposure means $L_1$ (comprising reflector 202 and the bulb $l$ mounted on frame 203) to stabilize the static latent image and to improve the contrast. The latent image is made visible by the developing means D. The developing means shown in FIGS. 10 and 16 can be used, and operation thereof is the same as previously described. After passing through the developing portion D directly below the lamp housing, the copy paper P nearest feed base 204 (FIGS. 35 and 36) is fed out by the rotation of feed-roller 205 (preferably grounded), which is in contact with the front lower surface of the copy paper on the copy paper feeding base 204. Guide 206 guides paper P forward and half around roller 205 to the point where it is laid onto photosensitive plate 1. It then proceeds along with the photosensitive plate 1, and the powder image is transferred. The paper proceeds to take out opening 194, and then stops. There, the copying paper is peeled off, and separate fixing means are employed to thermally fix the powder image. A press-spring 207 having one end fixed on the guide 206 is provided to hold paper P against roller 205. The ceiling plate forming opening 194 is feed base 204, and is unitary with body 187.

When the process is complete, photosensitive plate 1 and base 50 are moved back and developing means D and cleaning means C change their positions in the same manner as in the embodiment of FIG. 11. Plate 1 is cleaned, and the assembly returns to the static image forming portion, completing one cycle of operation. The cleaning means shown in FIGS. 11, 17 and 18 can all be used in this embodiment.

The operation of this embodiment is remarkably simple. Motor $M_4$ for stirring the toner is turned on and is used as described with reference to FIG. 11 by pushing start switch $S_2$, the high voltage source circuit, lamp house 188, and the lamp of illuminator $L_1$ are turned on. Also motor $M_8$ horizontally vibrates the frame for the discharger 195 (in place of the motor $M_3$ for reciprocating the latent image forming means as is shown in FIG. 2). Forward movement of the receiver base 50 and photosensitive plate 1, movement of the copy paper supply roller 205, and stopping and reverse motion of the receiver base 50 can all be carried out with only slight changes in the relay control circuit of FIG. 26. For timing the primary charge, the exposure (simultaneously with discharge) and the forward movement of the photosensitive plate after the completion of the exposure and discharge, it is preferred that a time-delay relay be employed.

It is also possible, in this embodiment of the invention, to employ the charging process aimed at the improvement of the copying efficiency described with reference to FIG. 29.

Figure 37:
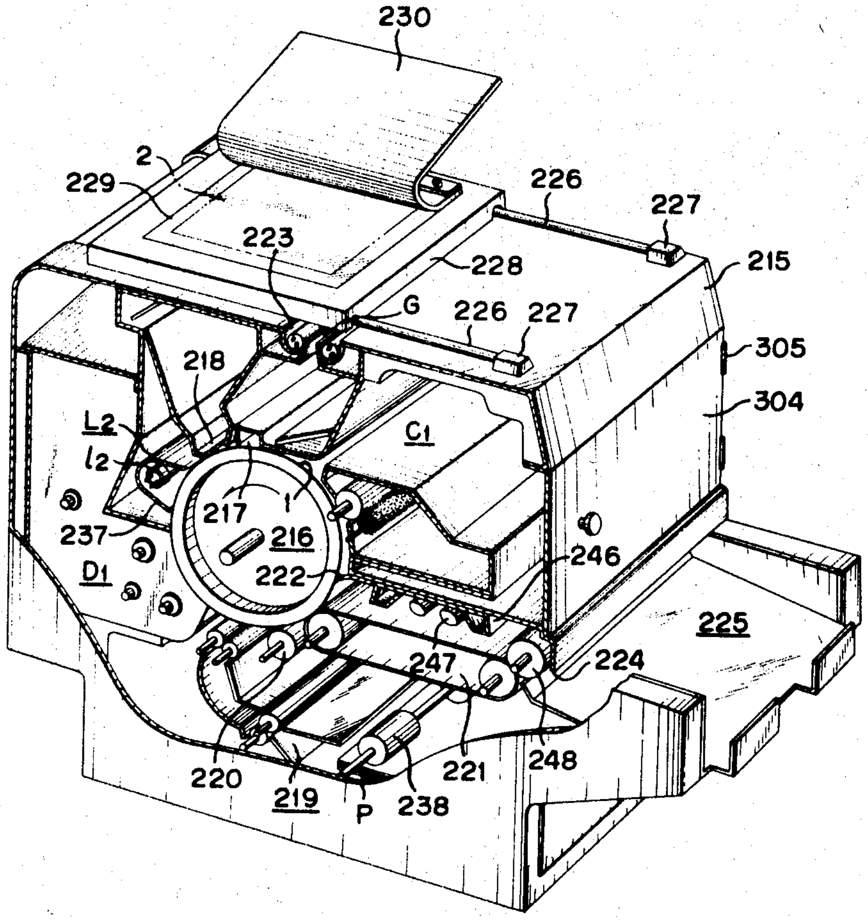
FIG. 37 is a perspective view, partially cut away, of an embodiment of the present invention employing a drum form of photosensitive plate.
Figures 38, 39:
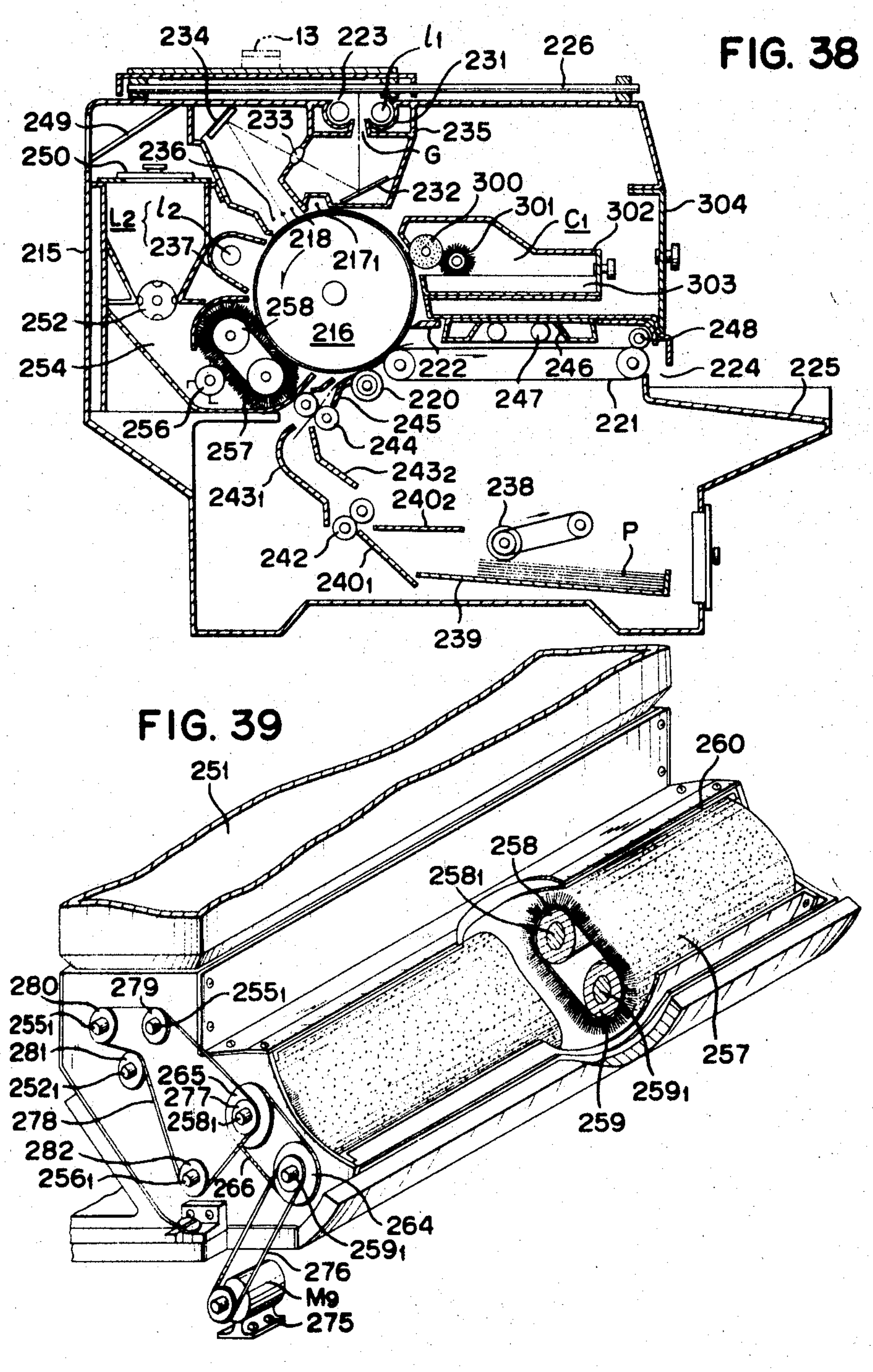
FIG. 38 is a vertical cross sectional side view of the embodiment of FIG. 37.
FIG. 39 is a perspective view of the fur brush belt for development and the toner supplying portion used for the embodiment of FIG. 37.

The embodiment of the invention employing a drum form of photosensitive plate is shown in FIGS. 37 and 38. The drum 216 is rotated at a peripheral speed of about 5 to 10 cm. per sec. in the direction shown by the arrow, by means of a motor (not shown), and is horizontally mounted. The photosensitive plate 1 comprising three layers is mounted on the periphery thereof, with the translucent insulating layer $1_3$ the outermost layer.

The other operative elements are clustered around the periphery of the drum. As shown in the drawings, these include discharger 217 for the primary charge, the discharger and exposure slit 218 for the secondary charge, total exposure means $L_2$, the developing means $D_1$, copy paper feeding means 219, copy roller 220, conveyor 221, copy paper peeling means 222, and cleaning means $C_1$.

On body or case 215 there is provided light slit G, which is of narrow width, and the window 223. On the lower portion of the front side of body 215, there is copy send-out opening 224 and the receiver 225 therefor. A pair of parallel rails 226 is fixed on the right and left sides of the top of the body by means of the bearings 227, and the original copy base 228 is mounted thereon in such a manner that it can be freely moved back and forth. Window 229, of transparent glass, or synthetic resin or such like, is mounted in copy base 228, and the original copy 2 is placed thereon. The copy is pressed flat from above by means of press-board 230. Copy base 228 is moved from the position shown in FIG. 27 in the manner described in U.S. Patent No. 2,959,095.

Lamp house 231 borders light ray slit G on both sides, and the internal surface thereof is a reflecting mirror or the like. Bulbs $1_1$, fluorescent lamps, are mounted therein. The original copy 2, placed on copy base 228, is irradiated through window 223. The illuminated surface of the original copy is projected onto the photosensitive plate 1 on the periphery of the drum through exposure slit 218 by the optical system. This is comprised of reflecting mirror 232, lens 233, and reflecting mirror 234, which pass the light coming from window 223 and the slit G. The optical system is surrounded by light box 235, which prevents light from passing into other parts of the device.

Copying is carried out in the same manner as in the case of the plane form embodiment. Direct current high voltage is applied to the discharge wire of discharger 217 to apply the primary charge to the surface of the rotating photosensitive plate 1. The static latent image in correspondence with the light image is formed on the photosensitive plate 1 as it is subjected to the secondary charge by means of the discharge source 236, at the same time when the light image of the original copy is projected from the exposure slit 218 by rotation of drum 216. Depending on the copy to be obtained, the secondary charge is an alternating corona discharge or direct current corona discharge of the polarity opposite to the primary charge. as previously described. The moving speed of the original copy 2 and that of the photosensitive plate 1 are required to have a specific relation, and, the drum driving mechanism and the original copy moving mechanism are interlocked in the manner described in U.S. Patent No 2,959,095.

Next, the static latent image on photosensitive plate 1 is irradiated by the total exposure means $L_2$ comprising reflecting mirror 237 and the bulb $1_2$, to increase the contrast and, thereafter, the image is developed by the developer of colored powder in developing means $D_1$. The copy paper feed roller 238 of the feeding means 219 pushes copy paper P, sheet by sheet, from the copy paper base 239 between the drum 216 and the roller 220 via feed-guides $240_1$, $240_2$, $243_1$, $243_2$, 245, and rollers 242, and 244. The paper is pressed onto the surface of the image-carrying plate by means of copy roller 220, and the powder image is transferred onto the copy paper P. With further rotation of the drum 216, the copy paper P is peeled off from photosensitive plate 1 by peeling means 222, and is transferred onto conveyor 221. This passes the paper toward the send-out opening and it is heated and thermally fixed thereon by infrared lamp 247, located within housing 246. Fixing occurs by melting of the resin in the developing powder. The paper is then sent onto the receiver 225 from the outlet 224, through the guide roller 248.

Developing powder remaining on the photosensitive plate is removed by means of the cleaning means $C_1$, and it is then turned back to the primary charge portion 217. One cycle of the copying process is thus completed.

The operation of the respective steps is essentially the same as in the case of the preceding plane-plate embodiment, and the structure of the respective processing portions is also almost the same to that previously described. Detailed explanations about these are therefore omitted. Differences in this device mainly reside in the portion where the developing powder is suppied, developed, and in the cleaning portion, and these will be described in detail.

Figure 40:
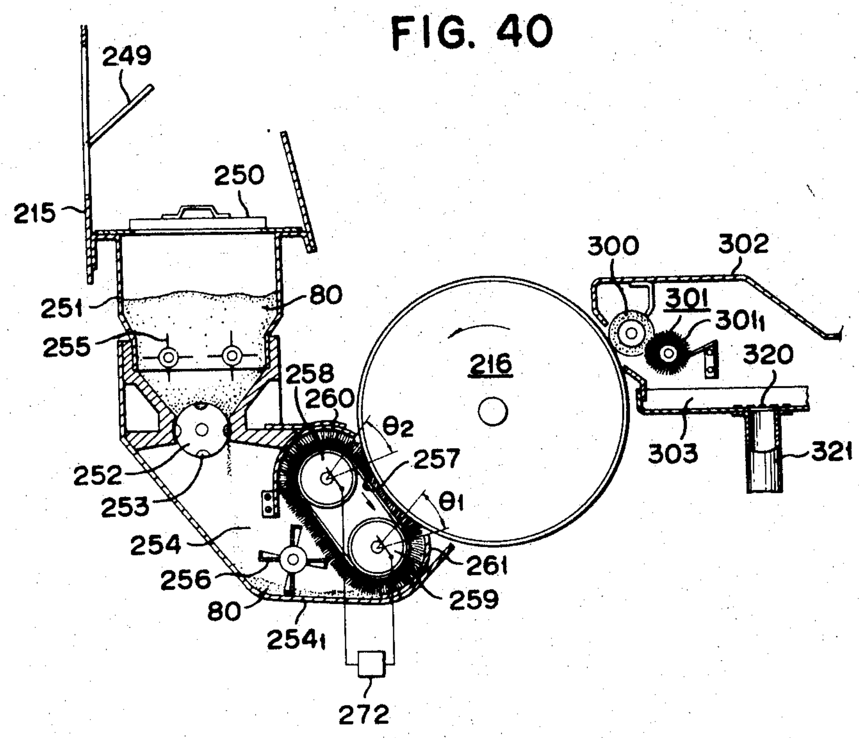
FIG. 40 is a vertical cross sectional view of FIG. 39.
Figure 41:
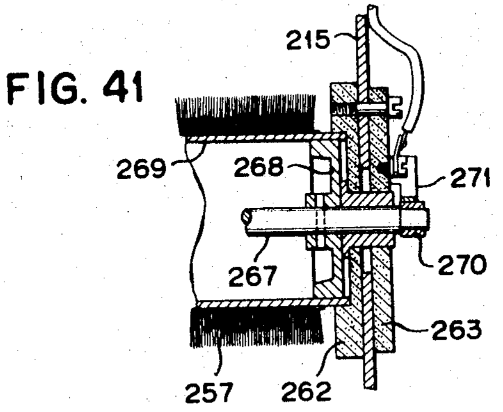
FIG. 41 is a cross sectional view of the end portion of the fur brush belt driving roller.

FIG. 40 shows the toner supplying portion, which comprises tank 251 having the lid 250 at the lower portion of opening 249 on the rear wall surface of the body 215. A rotary valve 252 is provided on the funnel-shaped opening at the lower portion of tank 251, and toner filling recess 253 therein is gradually supplied to the developing chamber 254. The toner in tank 251 and at the bottom $254_1$ of the developing chamber is intermittently or continuously stirred by means of the mixing blades 255 and 256, respectively, in order to prevent the toner from aggregating. Alternatively, the toner can be supplied from the horizontal direction by means of a screw conveyor.

Belt 257 has a fur brush mounted thereon, which press-contacts photosensitive plate 1 on drum 216. Belt 257 is spanned over front and rear rollers 258, 259, and driving force is imparted to one of said rollers. They are rotated at about 1.5 times the speed of the drum in the same direction in which the drum is rotated. It is possible to rotate the rollers in the opposite direction to the rotation of the drum, but a more or less foggy image may be obtained.

The fur brush functions as the carrier in the same manner as in the case of the embodiment shown in FIG. 16, and the same conditions apply to the fur brush of this embodiment, including the material from which it is made, the electric resistance thereof, and the like.

At the point where belt 257 goes around rollers 258, 259, the fur brush is surrounded by and contacts semicircular covers 260, 261. The distance between belt 257 and covers 260, 261 should be from 40 to 95% of the length of the hairs in the brush, so the hairs will contact the covers. The spacing controls the amount of toner which will adhere to the brush. Frictional (i.e., static) electricity is also generated between the hair and the covers and it is therefore desirable to select toner material of the same polarity as that of the frictional electricity charge on the toner. In case a positive-positive image is obtained, for example, the material is selected in such a manner that the toner is charged in the polarity opposite to that of the primary charge of the photosensitive plate. For example, when the primary charge is positive, and rabbit hair is used for the brush, a picolastic resin, or phenol resin colored by carbon or the like can be used. In case the secondary charge is negative, the static image is formed by the negative charge adhered on the light portion of the light image. It is noted that the reverse development in the Carlson process becomes the normal development in accordance with the instant process. Of course, when a negative-positive image is produced, it is the reverse.

The fur brush is rotated while the toner is agitated, and the toner has a charge of the opposite polarity (—) to that of the brush. It is adhered onto the brush, and is contacted against the photosensitive plate at the adjacent surface of the fur brush between the rollers 258 and 259. The latent image is developed by the attraction of the static electricity caused by the charge of the static image and the charge of the developer. In a preferred embodiment, rollers 258 and 259 are mounted on the body 215 through the insulating support plates 262, 263 to insulate the body. Shaft 267, end plate 268, and the cylindrical body 269 are made of conductive materials. Slip ring 270 is provided on the shaft, and a direct current voltage, such as a bias voltage of around 300 to 1000 v. is imparted thereto from electric source 272. The polarity of the applied bias voltage imparts the voltage of the opposite polarity to the charged polarity of the toner to the brush at the point $\theta_1$ (FIG. 40) where the fur brush leaves the photosensitive plate. Because of this, the brush attracts toner adhered on the non-image portion in this area and image fogginess is reduced.

In the area $\theta_2$ where the brush is beginning development, when the voltage of the same polarity as that of the charged polarity of the toner is imparted to the brush, adherence of the toner on the surface of the photosensitive plate 1 is accelerated. Thus, when the photosensitive plate is subjected to friction for a substantial distance by means of the fur brush belt, the accumulative effect is to accelerate toner deposition in the primary stage, there is an adjustment effect in the intermediate stage, and in the final stage there is a fog-removing effect. This device is remarkably effective for the present invention, wherein a static latent image of high contrast voltage is employed.

Figures 42, 43, 44:
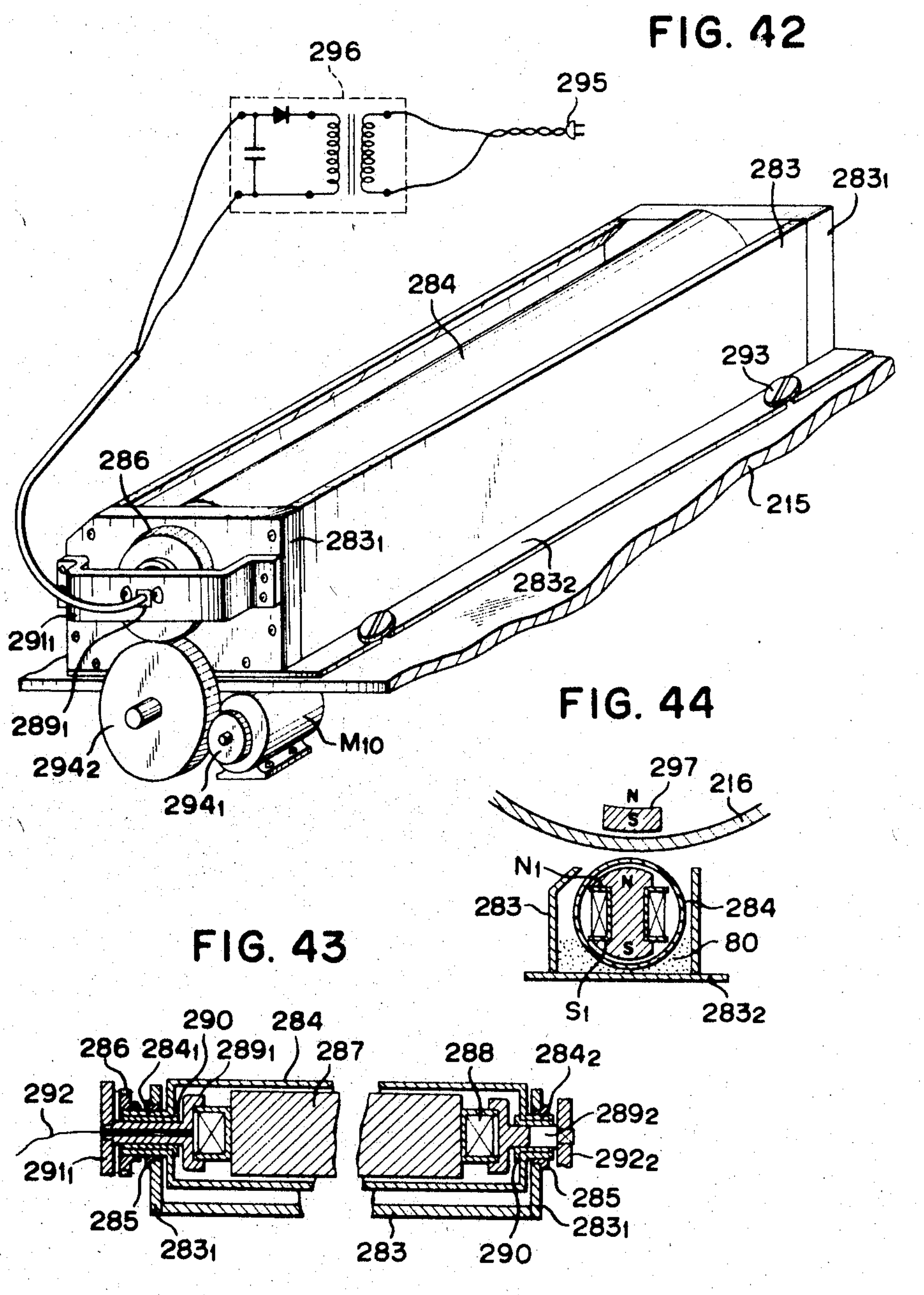
FIG. 42 is a perspective view showing a magnetic brush roll embodiment of the developer.
FIG. 43 is a cross sectional view of FIG. 42.
FIG. 44 is a horizontal cross sectional view of FIG. 42.

FIG. 39 shows an embodiment of the driving mechanism of the fur brush belt and the toner supplying means. Rotation of motor $M_9$, fixed on the body 215 by means of screws 275, is transmitted to the shaft $259_1$ of fur brush roller 259 through belt 276 or a gear, and it is further transmitted to rotate shaft $258_1$ of fur brush roller 258 through pulleys 264, 265 and belt 266. Other rotating elements, mounted on shafts $252_1$, $255_1$, and $256_1$ (rotary valve 252 and stirrer blades 255 and 256) are powered by belt 278 and the pulleys 279 through 282. The present invention is, of course, not restricted to the particular belt and fur brush arrangement described, and any fur brush roller having said carrier conditions can be employed. Further, other developing means can be employed, as described with reference to FIGS. 42–44.

In this case, a magnetic brush is employed, and therefore it is necessary to mix the toner and carrier particles. In the box 283, hollow shafts $284_1$ and $284_2$, made of non-magnetic material such as glass, synthetic resin, brass or the like, are provided on both ends of developing cylinder 284. Said hollow shafts are mounted horizontally on the side wall $283_1$ of the box 283 through bearings 285 and the transmission gear 286 is mounted on shafts $284_1$, $284_2$ to rotate same. The core 287 is contained in the cylinder 284. Magnetic coil 288 is wound on core 287, forming a unitary structure. Coil 288 is preferably formed of 3,000 to 3,500 turns of 0.4 mm. enameled wire. Fixed shafts $289_1$ and $289_2$ are provided on both ends of the coil, and are supported within the hollow shafts $284_1$ and $284_2$ by bearing 290. Shafts $289_1$ and $289_2$ are fitted to supports $291_1$ and $292_2$ fixed on box 283, and core 287 and coil 288 are thus fixed so as not to rotate. Lead wire 292 is connected through shaft $289_1$ to coil 288, and direct current is passed therethrough to form the electromagnet. Ordinary electric current source 295 (100 v. 50–60 c.p.s.) is rectified by the rectifier-smoothing device 296 to supply electricity to the coil, or electricity can be supplied from a battery of the same voltage. The pole facing the developer 80 is charged to be, for example, S polarity, and the pole facing the drum 216 is charged in N polarity. The base $283_2$ of box 283 is fixed onto the body 215 by bolts 293, and rotary cylinder 284 is mounted parallel to the drum 216 with a space between the same and the photosensitive plate of about 5 mm. Cylinder 284 is rotated by motor $M_{10}$ through gears $294_1$, $294_2$ and 286 in the same direction in which the drum 216 is rotated, at a speed about 2 to 4 times faster than the peripheral speed of the drum 216. The developing powder attracted by the S polarity at the lower portion of the electromagnet is carried by the rotating non-magnetic cylinder 284, and on the surface of the periphery thereof, a magnetic brush is formed to visualize the latent image on the photosensitive plate on the surface of the drum. The carrier in this case must also be rendered insulating, as in the case of the embodiment of FIG. 16 to impart to same a resistivity over $10^8\Omega$-cm.

When magnet 297 is placed in the hollow portion of the drum 216 with the S pole thereof faced against the N pole of core 287, the magnetic powder is attracted by drum 216, the development is accelerated. It is preferred that the poles $N_1$ and $S_1$ of core 287 be placed as close as possible to the adjoining side of cylinder 284 to increase the leaking magnetic flux therein, and on the opposite side the other two poles are placed further away, to weaken the magnetic power in the terminal stage of development. By doing this, developer removed from the surface of the drum will fall below. When the short fiber planting processing or roller processing or the like is carried out on the surface of the non-magnetic cylinder 284 (i.e., surface roughening processes), the friction against the developing powder is increased and transportation of the developing powder is improved.

Following is an explanation of the mechanism cleaning the photosensitive plate on the periphery of the rotary drum. It is noted that insulating layer $1_3$ on the surface of the photosensitive plate 1 is mechanically strong, and it is therefore resistive to strong frictional forces. Accordingly, the present invention is an improvement in several respects over conventional xerography systems.

As is shown in FIG. 38, elastic cleaning roller 300 is press-contacted against the photosensitive plate 1 on the surface of the drum at a point right after the copy paper has been peeled off. A cleaning brush 301 contacts cleaning roller 300 and brushes toner therefrom. Cleaning brush 301 and the cleaning roller 300 are mounted inside cover 302 fixed on the body 215, so that the toner removed from the photosensitive plate is not sprayed. At the lower portion thereof, drawer box 303 is provided as a toner receiver. Door 304 on the front surface of body 215 is mounted on hinge 305 (FIG. 37), and the drawer box can be emptied through this door.

Figure 45:
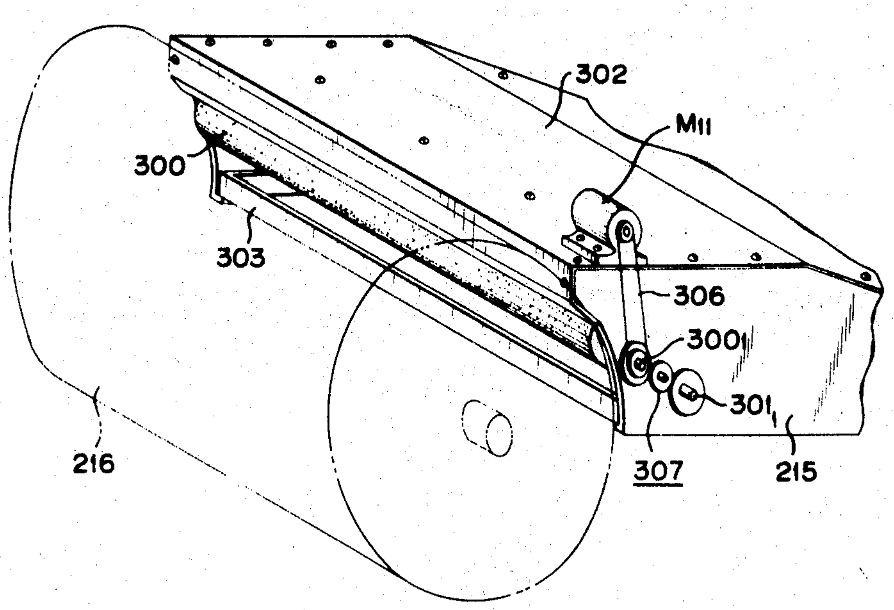
FIG. 45 is a perspective view of the cleaning means.

Motor $M_{11}$ is mounted on cover 302 as shown in FIG. 45, and by means of a belt 306 or gears, rotation is imparted to shaft $300_1$ of the cleaning roller 300, to rotate the same in the direction opposite to the rotation of the photosensitive plate 1. Rotation is also transmitted to the shaft $301_1$ of the roller brush 301 by means of gear 307 or a belt, to rotate the roller brush 301 in the direction opposite to the rotation of the roller 300.

Cleaning roller 300 has at least the outer periphery thereof made of a resilient or elastic material such as natural or synthetic rubber or the like. Sponge form natural or synthetic rubber is one of the most preferable materials. Materials having a hardness of around 15 to 50 are generally preferable. In case the hardness is over 50, it is difficult to obtain proper surface contact against the photosensitive plate, and in case the hardness is below 15, it is too strong mechanically and processing thereof is difficult.

Figure 46:
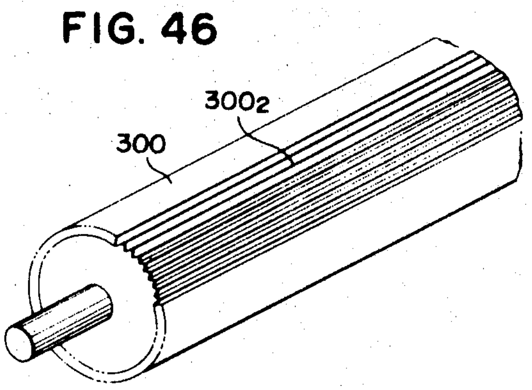
FIG. 46 is a perspective view of the cleaning roller.
Figure 47:
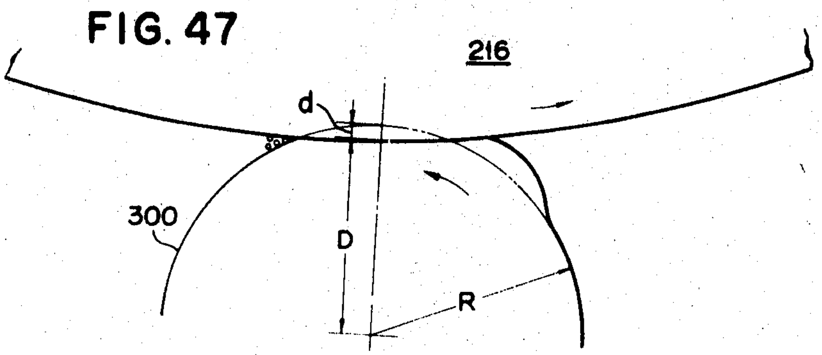
FIG. 47 is a diagram showing operation of the cleaning roller.

As is shown in FIG. 47, the outer diameter R of the cleaning roller 300 is slightly larger than the shortest distance D between the axial center and the photosensitive plate 1, the difference being *d*. Roller 300 is compressed as much as the difference *d*, and when the roller is contacted over a considerable portion of its width (for example, around $\frac{1}{10}$ of the periphery), and it is slowly rotated at the peripheral speed of 0.5 to 10 cm. per sec. in the direction opposite to the direction of the rotation of the photosensitive plate 1, a large contact resistance is developed and the frictional power is much larger than the static attraction of the remaining toner. The toner is thus rubbed off. The roller 300 is slowly rotated as is shown by the arrow in FIG. 47, and therefore the toner is not pinched between the two, so no deterioration of the toner is brought about. It is very effective to form slight concave and convex groove $300_2$ (FIG. 46) on the rubber cleaner roller 300 for increasing the cleaning effect. Cleaning roller 300 is preferably cleaned by the brush roller 301, because by always keeping cleaning roller 300 clean, it will not leave powder on the photosensitive plate 1. The rotation of brush 301 is generally faster than the rotation of roller 300, and powder on the roller 300 is removed mechanically by the strong frictional contact of the resilient hairs on the brush 301. So, when brush 301 is separated from roller 300, the toner powder is released into cover 302 by means of the strong movement caused by the resiliency thereof. Separated toner is in the form of a cake or fine powder, and while the toner in the form of a cake can easily fall down, the toner in fine particle form is apt to float in the air after it is separated. A part of receiver 303 is therefore made of air-permeating cloth 320 (FIG. 40), and cover 302 and receiving source 303 are made air tight. A ventilation window (not shown) a little larger than said cloth portion is provided on the base box, and the air within the cover 302 is sucked through the suction portion (not shown) from a suction pipe 321. As a result, the floating toner falls down at the bottom of receiver 303, and it is possible to prevent contamination caused by the toner floating out of the cover 302.

The above-described cleaning mechanism can also be applied to the devices shown in FIGS. 2 and 33.

Figures 48, 49:
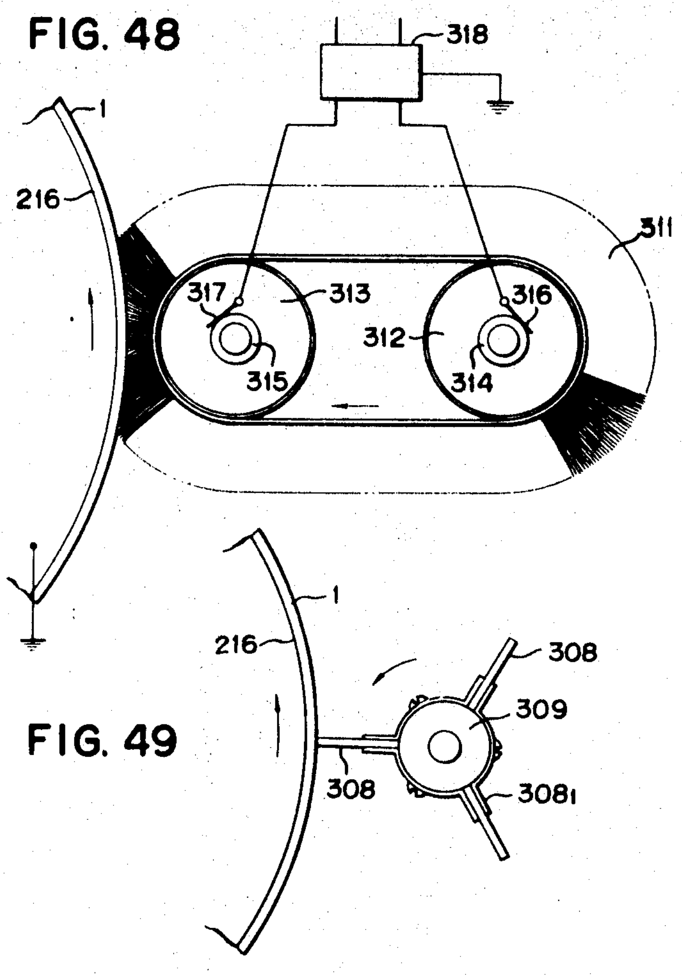
FIG. 48 is a diagram showing an embodiment wherein an endless belt of fur brush is employed as a cleaning roller.
FIG. 49 is a diagram showing a side view of the cleaning roller.

Conventional fur brush cleaning processes cannot be used effectively with the invention, because the attraction of the photosensitive plate and the toner is very strong. But when the below-mentioned method is adopted, it becomes possible to carry out cleaning by this method. As shown in FIG. 48, belt 311 has a fur brush, and both rollers 312 and 313 are conductive. A voltage is supplied from direct current source 318 by means of the slip rings 314, 315, and brushes 316, 317. When roller 313, nearest the photosensitive plate, is charged with the polarity opposite the polarity of the toner to be removed, and the other roller 312 is charged in the same polarity, toner on the surface of the photosensitive plate is attracted onto the fur brush statically, and when it is contacted against the other roller 312, it is expelled.

The cleaning mechanism shown in FIG. 49 is a modification of the mechanism shown in FIGS. 10, 17 and 18, wherein a plural number of cleaning plates 308 having more or less elasticity (such as hard rubber or the like) are radially mounted on the core shaft 309, and one of the cleaning plates is pushed strongly against the photosensitive plate to scrape off the toner. In operation, it functions the same as the previously described devices. However, shaft 309 is interlocked with the rotation of drum 216, and is intermittently rotated, a new cleaning plate being used for every copying cycle.

Electrical control for the drum type device is remarkably simple, and it is possible to utilize the method described in U.S. Patent No. 2,959,095, with minor obvious modifications.

It will be understood that various changes in the details, steps, materials and arrangements of parts, which have been herein described and illustrated in order to explain the nature of the invention, may be made by those skilled in the art within the principle and scope of the invention as defined in the appended claims. For example, it is possible to make the drum photosensitive plate into the conventional belt-form photosensitive plate employed in the conventional xerography systems. In this case, it is also possible to adopt the exposure system on the fixed photosensitive plate as has been explained in the embodiment wherein a plane form photosensitive plate is used, as shown in FIGS. 2, 3 and 33, without being restricted to the slit exposure system wherein the original image is projected on the moving photosensitive plate. Further, it is more effective to use the charge-exposure system as is shown in FIGS. 30 through 32.

What is claimed is:

1. An electrophotographic copying device which comprises:

charging means for applying a primary charge on the surface of a photosensitive plate, which plate comprises a base, a photoconductive layer and a translucent insulating layer overlaid thereon;

means for simultaneously exposing an original image and for applying a corona discharge onto the surface of said charged insulating layer;

means for forming a high contrast static image of the original image on the surface of said insulating layer by uniformly irradiating the whole surface of said insulating layer, thereby activating the photoconductive layer;

developing means for visualizing said static latent image;

means for transferring said visualized image onto copying material; and cleaning means for removing residual developer from the surface of said insulating layer remaining after the transfer of the image, whereby the photosensitive plate is prepared for repeated use.

2. An electrophotographic copying device as claimed in claim 1, wherein said means for simultaneously exposing the original image and for applying the corona discharge on the surface of the primary charged insulating layer of the photosensitive plate comprises an alternating current corona discharger.

3. An electrophotographic copying device as claimed in claim 1, wherein the developing means for visualizing the static latent image formed on the surface of the insulating layer of the photosensitive plate comprises a fur brush developer.

4. An electrophotographic copying device as claimed in claim 1, wherein the means for transferring the visible image formed on the surface of the insulating layer of the photosensitive plate onto the copying material comprises means for physically pressing said copying material against said insulating layer in the absence of an external electric field.

5. An electrophotographic copying device as claimed in claim 1, wherein the cleaning means for removing residual developer from the surface of said insulating layer remaining after the visible image formed on the insulating layer of the photosensitive plate is transferred onto the copying material comprises an elastic brush.

6. An electrophotographic copying device as claimed in claim 1, wherein the developing means for visualizing the static image formed on the surface of the insulating layer of the photosensitive plate comprises a magnetic brush and which utilizes a developer which comprises a carrier having an insulating resistivity of greater than $10^8\Omega$-cm. and a toner.

7. An electrophotographic copying device as claimed in claim 3, wherein said fur brush developing means comprising an endless belt in contact with the surface of said insulating layer, means to rotate said belt, and means for supplying toner to said belt.

8. An electrophotographic copying device as claimed in claim 7, wherein said fur brush developing means additionally comprises means for applying a bias voltage to said belt at a point adjacent to the final point of contact with said layer, said voltage providing a charge of the same polarity as the polarity generated by the frictional charge against the toner.

9. An electrophotographic copying device as claimed in claim 8, wherein the endless belt additionally comprises means for applying a second bias voltage for charging the belt at a point adjacent the initial point of contact with said layer, with a charge of the polarity opposite to the polarity of the charge generated by said first bias voltage.

10. An electrophotographic copying device as claimed in claim 6, and additionally comprising means for mixing air with said toner, said toner being attracted to said brush by a frictional charge.

11. An electrophotographic copying device as claimed in claim 7, wherein said endless belt includes adjusting means to vary the contact-pressure of said belt against the static image surface.

12. An electrophotographic copying device as claimed in claim 3, wherein said fur brush developer comprises:

- a container for toner, said container having a plurality of small holes in the lower portion thereof;
- a control member adjacent the lower portion of said container, said control member also having a plurality of holes therein and being mounted for movement of said holes into and out of registration with the holes in said container, whereby said toner is stirred and the amount thereof falling through said holes is controlled; and
- a fur brush mounted below said container and said control member and having a plurality of holes for passage of said toner.

13. An electrophotographic copying device as claimed in claim 5, wherein said elastic brush cleaner includes means for charging said brush in the polarity opposite to the polarity of the residual developer remaining on the surface of the insulating layer of the photosensitive plate.

14. An electrophotographic copying device as claimed in claim 13, wherein the elastic brush cleaner additionally comprises a second charging means for charging said brush in the polarity opposite to the polarity of the first charging means, to remove developer adhered on said brush statically.

15. An electrophotographic copying device as claimed in claim 5, wherein said cleaning means comprises an elastic cleaning roller mounted to press-contact the surface of said insulating layer with sufficient pressure to be slightly flattened thereagainst, and means for rotating said roller slowly in the direction opposite to the motion of the photosensitive plate.

16. An electrophotographic copying device as claimed in claim 15, wherein said elastic cleaning roller has a plurality of small transverse grooves on the surface thereof wherein toner is collected.

17. An electrophotographic copying device as claimed in claim 6, wherein said magnetic brush developing means comprises:

- a hollow, rotating, non-magnetic cylinder;
- a non-rotating electromagnet mounted within said cylinder and having one pole thereof adjacent said photosensitive plate;
- a developer container having an opening for feeding developer adjacent the other pole of said electromagnet;
- the polarity of said first pole being opposite to the charge on said photosensitive plate, whereby developer is magnetically attracted to said cylinder and, on rotation thereof, is repelled by said cylinder and attracted by the charge on said plate, thus visualizing the image.

18. An electrophotographic copying device as claimed in claim 6, wherein said magnetic brush developing means comprises:

- a yoke having two, longitudinal, non-magnetic path-controlling sections defining a central open cavity;
- a rotatably mounted permanent magnet within said cavity;
- a container for developer mounted below said yoke;
- developer in said container being attracted to said non-magnetic sections when said magnet is in a first position and repelled from said sections when said magnet is rotated ninety degrees.

19. An electrophotographic copying device which comprises:

- a photosensitive plate, which plate comprises a base having a photoconductive layer and a translucent insulating layer overlaid thereon;
- means for moving said photosensitive plate;
- charging means for applying a primary charge on the surface of said photosensitive plate;
- means for simultaneously exposing an original image and for applying a corona discharge onto the surface of said charged insulating layer;
- means for forming a high contrast static image of the original image on the surface of the insulating layer comprising a light source irradiating the whole surface of said insulating layer, thereby activating the photoconductive layer;
- developing means for visualizing the static image with a developer;
- means for laying copying material on said visible image in synchronous relation with the movement of said photosensitive plate;
- means pressing the copying material onto the visible image for transferring the visible image onto the copying material;
- means for peeling off the copying material from the photosensitive plate after transfer of the visible image which comprises a source of compressed air directed against the said material and a peeling-lever operated against the copying material; and cleaning means for removing residual developer remaining on the surface of said insulating layer to prepare the photosensitive plate for repeated use after the copying material is peeled off.

20. An electrophotographic copying device as claimed in claim 1, and additionally comprising:

means for moving said corona discharger over said photosensitive plate;

a pair of tiltable shield boards defining a central slit over said corona discharger; and means for tilting said shield boards as said corona discharger moves over said photosensitive plate, said tilting being adapted to maintain said shield boards substantially parallel with the rays of said original image.

21. A reading and electrophotographic copying device which comprises:

a photosensitive plate comprising a base and a photoconductive layer and a translucent insulating layer overlaid thereon;

charging means capable of applying a primary charge to said insulating layer;

an optical system capable of projecting an original image onto said photosensitive plate;

means for applying a corona discharge to the charged surface of said insulating layer simultaneously with the projection of said original image;

reading means capable of projecting said image, said reading means comprising a semitransparent mirror located in the light path of said optical system and a screen for visualizing the image reflected by said mirror;

means comprising a light source for uniformly irradiating the whole surface of said insulating layer after projection of said original image thereon, whereby said photoconductive layer is activated and a high contrast static image is formed on said insulating layer;

developing means for visualizing the static image with a developer;

means for transferring the developed image onto copying material; and cleaning means for removing residual developer on the surface of said insulating layer after transfer of the image to said copying material, to prepare the photosensitive plate for repeated use.

22. An electrophotographic copying device as claimed in claim 1, wherein the means for transferring powder image onto the copying material comprises means for forming an electrostatic image on the insulating layer of the photosensitive plate, laying the said translucent insulating layer onto the photoconductive layer, means for visualizing said image with a colored toner charged in a polarity opposite to the polarity of said image, means for charging said insulating layer inclusive of said powder image to an optional polarity and transferring the image onto the copying material overlaid thereon.

23. An electrophotographic copying device as claimed in claim 1, wherein means for irradiating corona discharge has the optically opened upper portion and is so arranged that the charge width and the slit exposure width are equal.

References Cited

UNITED STATES PATENTS 3,071,645 1/1963 McNaney ---------- 95—1.7 X

JOHN M. HORAN, *Primary Examiner.*

U.S. Cl. X.R.

355—15, 8

FO-1050
(5/69)

UNITED STATES PATENT OFFICE
CERTIFICATE OF CORRECTION

Patent No. 3,438,706 Dated June 10, 1969

Inventor(s) Hiroshi Tanaka et al.

It is certified that error appears in the above-identified patent and that said Letters Patent are hereby corrected as shown below:

Column 1, line 64, "bene" should read --been--. Column 5, line 31, cancel "have the same potential, and they are preferably". Column 10, line 59, "$42_2$" should read --$41_2$--. Column 12, line 39, "receviing" should read --receiving--. Column 13, line 65, "177" should read --117--. Column 15, line 13, "$S_{22}$" should read --$S_2$--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents

Disclaimer 3,438,706.—*Hiroshi Tanaka*, *Shinkichi Takahashi*, and *Tetsuo Hasegawa*, Tokyo, and *Toshihiko Sato*, Saitama-ken, Japan. ELECTROPHOTOGRAPHIC DEVICE. Patent dated Apr. 15, 1969. Disclaimer filed Apr. 18, 1977, by the assignee, *Canon Kabushiki Kaisha*.

Hereby enters this disclaimer to claims 1, 2 and 4 of said patent.

[*Official Gazette July 18, 1978.*]